US009438784B2

(12) United States Patent
Endo

(10) Patent No.: US 9,438,784 B2
(45) Date of Patent: Sep. 6, 2016

(54) CAMERA OPERATION TERMINAL, CAMERA, IMAGING SYSTEM, IMAGING METHOD, AND COMPUTER-READABLE DEVICE

(71) Applicant: Olympus Corporation, Hachioji-shi, Tokyo (JP)

(72) Inventor: Takahisa Endo, Tokyo (JP)

(73) Assignee: Olympus Corporation, Tokyo (JP)

( * ) Notice: Subject to any disclaimer, the term of this patent is extended or adjusted under 35 U.S.C. 154(b) by 70 days.

(21) Appl. No.: 14/230,309

(22) Filed: Mar. 31, 2014

(65) Prior Publication Data

US 2014/0347503 A1    Nov. 27, 2014

(30) Foreign Application Priority Data

May 21, 2013  (JP) ................................. 2013-107091

(51) Int. Cl.
*H04N 5/225*    (2006.01)
*H04N 5/232*    (2006.01)

(52) U.S. Cl.
CPC ...... *H04N 5/23203* (2013.01); *H04N 5/23216* (2013.01)

(58) Field of Classification Search
CPC ............. H04N 5/232; H04N 5/23222; H04N 5/23225; H04N 5/23216; H04N 5/23203
USPC .................................................. 348/207.11
See application file for complete search history.

(56) References Cited

U.S. PATENT DOCUMENTS

| 8,750,674 B2 * | 6/2014 | Cornell | H04N 5/232 386/224 |
| 2004/0041911 A1 * | 3/2004 | Odagiri | G06F 1/1632 348/207.1 |
| 2004/0165077 A1 * | 8/2004 | Ohmori | H04N 5/23203 348/211.2 |
| 2004/0189850 A1 * | 9/2004 | Chang | H04N 5/23293 348/333.07 |
| 2012/0270599 A1 * | 10/2012 | Mori | H04M 1/72527 455/556.1 |
| 2012/0282977 A1 * | 11/2012 | Haleluk | H04B 1/3888 455/556.1 |
| 2013/0002939 A1 * | 1/2013 | O'Neill | G02B 7/14 348/360 |
| 2013/0178245 A1 * | 7/2013 | Kulas | H04M 1/0254 455/556.1 |
| 2014/0132781 A1 * | 5/2014 | Adams | H04N 5/2254 348/207.1 |
| 2014/0300809 A1 * | 10/2014 | Oliveira | H04N 5/232 348/376 |

FOREIGN PATENT DOCUMENTS

JP    2012-186698    9/2012

* cited by examiner

*Primary Examiner* — Twyler Haskins
*Assistant Examiner* — Dwight C Tejano
(74) *Attorney, Agent, or Firm* — John C. Pokotylo; Straub & Pokotylo

(57) ABSTRACT

A display control section causes a display section to display an image corresponding to imaging data generated by an imaging element before the wireless reception of imaging data which is wirelessly transmitted from a camera is started, and causes the display section to display an image corresponding to imaging data which is wirelessly received after the wireless reception of the imaging data which is wirelessly transmitted from the camera is started. A parameter generating section generates imaging parameters when an instruction for the imaging parameters is input in a state where the image corresponding to the imaging data generated by the imaging element is displayed on the display section. A communication control section causes a wireless communication circuit section to wirelessly transmit the imaging parameters generated by the parameter generating section to the camera, and to wirelessly receive the imaging data wirelessly transmitted from the camera.

12 Claims, 16 Drawing Sheets

| CAMERA TYPE | CAMERA NAME | ZOOM AMOUNT [f] | FOCUS POSITION [m] | | WHITE BALANCE [K] |
|---|---|---|---|---|---|
| 1 | CAMERA 1 | 28 | 5 | | 5500 |
| 2 | CAMERA 2 | 50 | 3 | | 3200 |
| 3 | CAMERA 3 | 28 | 7 | | 5500 |
| N | CAMERA N | 35 | 5 | | 5000 |

CAMERA OPERATION TERMINAL, CAMERA, IMAGING SYSTEM, IMAGING METHOD, AND COMPUTER-READABLE DEVICE

BACKGROUND OF THE INVENTION

1. Field of the Invention

The present invention relates to a technique for remotely controlling a camera.

Priority is claimed on Japanese Patent Application No. 2013-107091, filed May 21, 2013, the contents of which are incorporated herein by reference.

2. Description of Related Art

Imaging systems are known in which a portable terminal (such as a smartphone) having an imaging section and a display section and an imaging unit (such as a digital camera) having an imaging section are connected to each other through wireless communication, and the imaging unit is controlled from the portable terminal Japanese Unexamined Patent Application, First Publication No. 2012-186698 discloses an example of the imaging system. Japanese Unexamined Patent Application, First Publication No. 2012-186698 discloses that image data is transmitted from the digital camera to the portable terminal after the portable terminal is wirelessly connected to the digital camera, and an image captured by the digital camera is displayed on the display section of the portable terminal in which the image data is received. In addition, when a user performs a zoom operation on a display screen of the portable terminal in a state where the image captured by the digital camera is displayed on the display section of the portable terminal, zoom settings of the digital camera are changed.

An imaging system in which a portable terminal as a camera operating terminal and an imaging unit as a camera operate in conjunction with each other has the following advantages.

(1) It is possible to use a high-quality image from the imaging unit in the portable terminal.

(2) An image captured by the imaging unit is displayed on a display section of the portable terminal, and thus it is possible to delete contents of the display section of the imaging unit, and to achieve a reduction in cost.

(3) It is possible to use various video data through application software of the portable terminal

SUMMARY OF THE INVENTION

According to a first aspect of the present invention, a camera operating terminal includes: an imaging element of which a visual field range is adjusted so as to overlap at least a portion of the visual field range of a camera, and which generates a first imaging data; a communication interface which wirelessly communicates with the camera; a display interface which displays an image; an operation interface which receives a user's operation; a display control section which causes the display interface to display an image corresponding to the first imaging data before the communication interface starts wireless reception of a second imaging data which is wirelessly transmitted from the camera, and causes the display interface to display an image corresponding to the second imaging data wirelessly received by the communication interface after the communication interface starts the wireless reception of the second imaging data; a parameter generating section which generates imaging parameters when an instruction for the imaging parameters is input by the operation interface being operated in a state where the image corresponding to the first imaging data is displayed on the display interface; and a communication control section which causes the communication interface to wirelessly transmit the imaging parameters generated by the parameter generating section to the camera, and causes the communication interface to wirelessly receive the imaging data which is wirelessly transmitted from the camera.

According to a second aspect of the present invention, in the first aspect, the communication control section may cause the communication interface to wirelessly transmit the imaging parameters generated by the parameter generating section to the camera before the communication interface starts the wireless reception of the second imaging data.

According to a third aspect of the present invention, in the first aspect, the camera operating terminal may further include an imaging control section that sets the imaging parameters generated by the parameter generating section in the imaging element, and controls an operation of the imaging element.

According to a fourth aspect of the present invention, in the third aspect, the camera operating terminal may further include a storage section that stores imaging parameters which are set in the camera when the camera is started up, and the imaging control section may set the imaging parameter stored by the storage section in the imaging element when the camera operating terminal is started up.

According to a fifth aspect of the present invention, in the first aspect, the camera operating terminal may further include a report control section that performs control of reporting a user that the camera is enabled to perform imaging when a connection of wireless communication with the camera is established.

According to a sixth aspect of the present invention, in the first aspect, the camera operating terminal may further include a report control section that performs control of reporting to a user that imaging by the camera is not performed when an imaging instruction is input by the operation interface being operated before a connection of wireless communication with the camera is established.

According to a seventh aspect of the present invention, in the first aspect, the camera operating terminal may further include a recording control section that records the imaging data generated by the imaging element in a memory when an imaging instruction is input by operation interface being operated before a connection of wireless communication with the camera is established.

According to an eighth aspect of the present invention, there is provided a camera including: an imaging element that generates an imaging data; a communication interface that wirelessly communicates a camera operating terminal; an imaging control section that sets imaging parameters received by the communication interface in the imaging element when the communication interface wirelessly receives the imaging parameters from the camera operating terminal, and controls an operation of the imaging element; and a communication control section that causes the communication interface to wirelessly receive the imaging parameters which are wirelessly transmitted from the camera operating terminal, and causes the communication interface to wirelessly transmit the imaging data in which the imaging parameters received by the communication interface are set, to the camera operating terminal.

According to a ninth aspect of the present invention, an imaging system includes: a camera operating terminal; and a camera, wherein the camera operating terminal includes a first imaging element of which a visual field range is adjusted so as to overlap at least a portion of a visual field range of the camera, and which generates a first imaging data, a first communication interface that wirelessly communicates with the camera, a display interface that displays an image, an operation interface that receives a user's operation, a display control section that causes the display interface to display an image corresponding to the first imaging data before the first communication interface starts wireless reception of a second imaging data which is wirelessly transmitted from the camera, and causes the display interface to display an image corresponding to the second imaging data wirelessly received by the first communication interface after the first communication interface starts the wireless reception of the second imaging data, a parameter generating section that generates imaging parameter when an instruction for the imaging parameters is input by the operation interface being operated in a state where the image corresponding to the first imaging data is displayed on the display interface, and a first communication control section that causes the first communication interface to wirelessly transmit the imaging parameter generated by the parameter generating section to the camera, and causes the first communication interface to wirelessly receive the second imaging data, and wherein the camera includes a second imaging element that generates a third imaging data, a second communication interface that wirelessly communicates with the camera operating terminal, an imaging control section that sets imaging parameters received by the second communication interface in the second imaging element when the second communication interface wirelessly receives the imaging parameter from the camera operating terminal, and controls an operation of the second imaging element, and a second communication control section that causes the second communication interface to wirelessly receive the imaging parameters which are wirelessly transmitted from the camera operating terminal, and causes the second communication interface to wirelessly transmit the third imaging data in which the imaging parameters received by the second communication interface are set, to the camera operating terminal.

According to a tenth aspect of the present invention, an imaging method includes: a step of causing a display interface of a camera operating terminal to display an image corresponding to a first imaging data generated by a first imaging element of the camera operating terminal of which a visual field range is adjusted so as to overlap at least a portion of a visual field range of a camera, before a first communication interface of the camera operating terminal starts wireless reception of a second imaging data which is wirelessly transmitted from the camera; a step of causing a parameter generating section of the camera operating terminal to generates imaging parameters when an instruction for the imaging parameters is input by an operation interface of the camera operating terminal being operated in a state where the image corresponding to the first imaging data is displayed on the display interface, a step of causing the first communication interface to wirelessly transmit the imaging parameters generated by the parameter generating section to the camera, a step of causing a second communication interface of the camera to wirelessly receive the imaging parameters wirelessly transmitted from the camera operating terminal, a step of causing an imaging control section of the camera to set the imaging parameters received by the second communication interface in an second imaging element of the camera, and to control an operation of the second imaging element, a step of causing the second communication interface to wirelessly transmit a fourth imaging data, generated by the second imaging element in which the imaging parameters received by the second communication interface are set, to the camera operating terminal, a step of causing the first communication interface to wirelessly receive the second imaging data, and a step of causing the display interface to display an image corresponding to a second imaging data wirelessly received by the first communication interface.

According to an eleventh aspect of the present invention, a computer-readable device is provided that sores a program that causes a computer to perform the steps of: causing a display interface to display an image corresponding to a first imaging data generated by an imaging element of which a visual field range is adjusted so as to overlap at least a portion of a visual field range of a camera before a communication interface starts wireless reception of a second imaging data which is wirelessly transmitted from the camera; generating imaging parameters when an instruction for the imaging parameters is input by an operation interface being operated in a state where the image corresponding to the first imaging data is displayed on the display interface; causing the communication interface to wirelessly transmit the generated imaging parameters to the camera; causing the communication interface to wirelessly receive the second imaging data; and causing the display interface to display an image corresponding to the second imaging data wirelessly received by the communication interface.

According to a twelfth aspect of the present invention, a computer-readable device is provided that sores a program that causes a computer to perform the steps of: causing a communication interface to wirelessly receive imaging parameters wirelessly transmitted from a camera operating terminal; setting the imaging parameters received by the communication interface in the imaging element, and controlling an operation of the imaging element; and causing the communication interface to wirelessly transmit an imaging data, generated by the imaging element in which the imaging parameters received by the communication interface are set, to the camera operating terminal.

DETAILED DESCRIPTION OF THE INVENTION

Figure 1A:
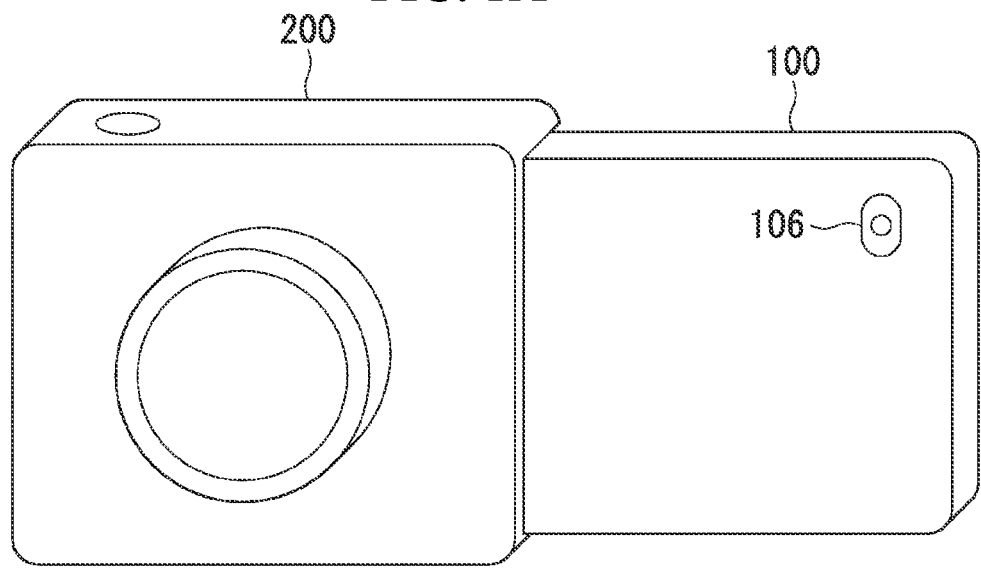
FIG. 1A is a perspective view illustrating an imaging system according to each embodiment of the present invention.
Figure 1B:
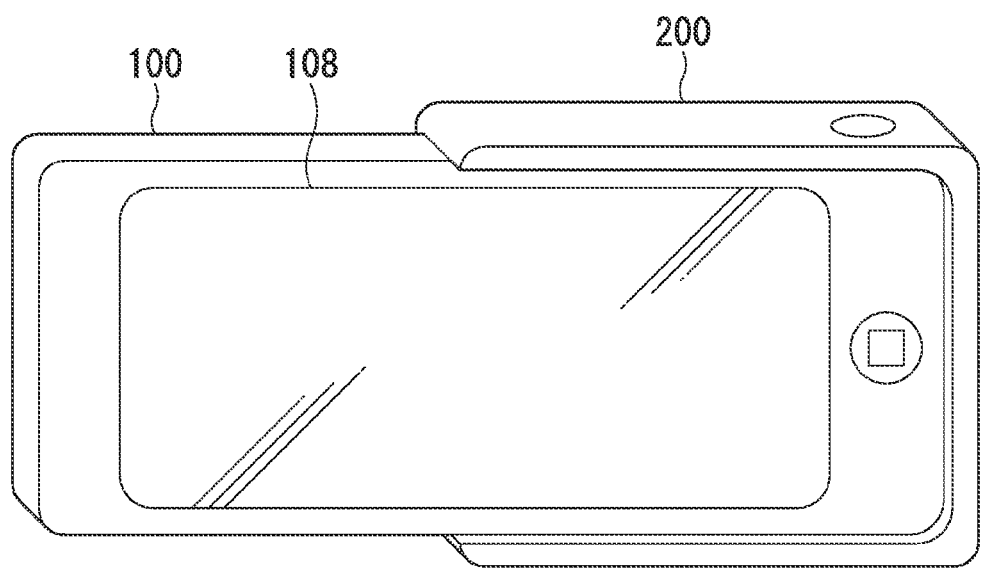
FIG. 1B is a perspective view illustrating the imaging system according to each embodiment of the present invention.

Hereinafter, embodiments of the present invention will be described with reference to the accompanying drawings. Hereinafter, a description be will be given of an example of an imaging system including a camera operating terminal that operates a camera (remote camera) according to a user's instructions, and a camera which is operated by the camera operating terminal. In addition, an example of an imaging method using the imaging system will be described below. FIGS. 1A and 1B illustrate examples of the imaging system of the following respective embodiments.

The imaging system includes a camera operating terminal 100 and a camera 200. FIG. 1A illustrates a state when the camera operating terminal 100 and the camera 200 are viewed from the front side, and FIG. 1B illustrates a state when the camera operating terminal 100 and the camera 200 are viewed from the back side. In a state where the camera operating terminal 100 is mounted on the camera 200, both can be mechanically connected and fixed to each other. An imaging section 106 for capturing an image is disposed at the front side of the camera operating terminal 100, and a display section 108 for displaying an image is disposed at the back side of the camera operating terminal 100.

In a state where the camera operating terminal 100 and the camera 200 are fixed to each other, respective imaging sections are directed toward substantially the same direction. Thereby, the visual field ranges of the respective imaging elements can be mechanically adjusted so that at least some of the visual field ranges (range capable of being captured by the imaging elements) of the respective imaging elements of the camera operating terminal 100 and the camera 200 overlap each other. In addition, the visual field ranges of the respective imaging elements can also be made to be substantially coincident with each other.

The camera operating terminal 100 and the camera 200 may be able to be fixed to each other so that at least some of the visual field ranges of the respective imaging elements overlap each other, and a state when both are fixed to each other may be different from the states shown in FIGS. 1A and 1B. For example, the camera operating terminal 100 and the camera 200 may be fixed to each other using other members or the like. In addition, the camera operating terminal 100 and the camera 200 may be fixed to each other in a state where other members are inserted between the camera operating terminal 100 and the camera 200 so that the camera operating terminal 100 and the camera 200 do not come into direct contact with each other.

In addition, as shown below, the degrees of accuracy with which the visual field ranges of the respective imaging elements of the camera operating terminal 100 and the camera 200 are coincident with each other may be improved. For example, by comparing imaging data generated by performing imaging for each different zoom setting in the camera 200 with imaging data generated by performing imaging in the camera operating terminal 100, the display range of an image may be adjusted with respect to the imaging data generated in the camera operating terminal 100. Such adjustment may be performed, for example, when the camera operating terminal 100 and the camera 200 are connected to each other for the first time, or when initial settings (calibration) are selected from an operation screen displayed on the display section 108 of the camera operating terminal 100.

(First Embodiment)

Figure 2:
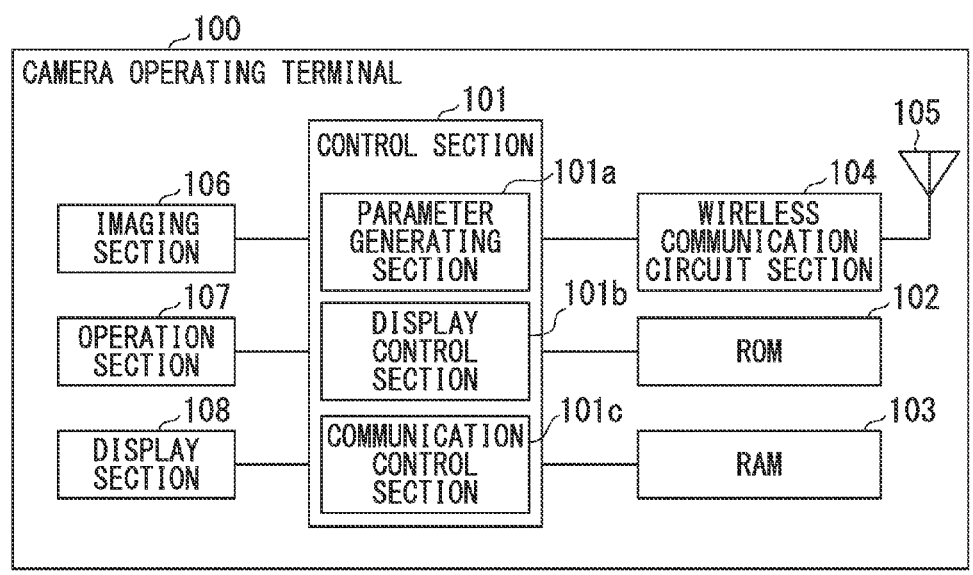
FIG. 2 is a block diagram illustrating a configuration of a camera operating terminal according to a first embodiment of the present invention.

Hereinafter, a first embodiment of the present invention will be described. FIG. 2 is a diagram illustrating an electrical configuration of the camera operating terminal 100 according to the present embodiment. The camera operating terminal 100 shown in FIG. 2 includes a control section 101, a ROM 102, a RAM 103, a wireless communication circuit section 104, an antenna 105, an imaging section 106, an operation section 107, and a display section 108, which are connected to each other as shown in the drawing.

The control section 101 operates according to a program stored in the ROM 102, and controls the operation sequence of the camera operating terminal 100. The ROM 102 is a nonvolatile memory such as a flash ROM, and various setting information including communication setting parameters and program data for controlling the camera operating terminal 100 is stored in the ROM 102.

The RAM 103 is used as a work area used in the arithmetic operation or the like of the control section 101, and is an area for temporarily storing various setting information or the like. The wireless communication circuit section 104 and the antenna 105 are configured to perform wireless communication with the camera 200. The wireless communication circuit section 104 is a communication interface (communication module) which is constituted by a high-frequency circuit section required for wireless communication, an encoding and decoding circuit section, a buffer memory, and the like. The antenna 105 is connected to the wireless communication circuit section 104. In the present embodiment, as an example of a wireless communication system, a wireless system such as a wireless LAN (IEEE 802.11) is used.

The imaging section 106 is configured by a lens that images incident light, an imaging element (such as CCD or CMOS sensor) having a photoelectric converter that converts imaged light into an electrical signal, an AD converter (analog-digital converter) that converts an analog electrical signal which is output from the imaging element into a digital electrical signal, and the like. With such as configuration, the imaging section 106 generates imaging data (first image) of a visual field range. Whenever imaging data of one frame can be read out, the imaging section 106 notifies the control section 101 that the imaging data is prepared, on the basis of an interrupt. The control section 101 reads out the imaging data from the imaging section 106, performs required image processing appropriately, and stores the imaging data after image processing in a predetermined area of the RAM 103. As described above, in a state where the camera operating terminal 100 and the camera 200 are fixed to each other, the visual field range of the imaging element included in the imaging section 106 is adjusted so as to overlap at least a portion of the visual field range of the imaging element of the camera 200.

The operation section 107 includes a plurality of switches such as a power switch, an operation switch, and a setting switch, and notifies the control section 101 of states of these switches and a change in the states as electrical signals. In addition, a plurality of LEDs for reporting the connection state and communication state with the camera 200 are disposed in the operation section 107.

The display section 108 is constituted by a display interface (display device) such as a liquid crystal device, and a touch panel which is an operation interface (operation device), and displays an image based on imaging data generated by the imaging section 106 of the camera operating terminal 100, or an image based on imaging data generated by the imaging section 206 of the camera 200. In addition, the display section 108 is used as a user interface that receives an operation of a user to perform settings of imaging parameters. The imaging parameter is a parameter for imaging, and includes, for example, a parameter for the setting of the visual field range of the imaging element.

More specifically, the control section 101 realizes at least functions of a parameter generating section 101a, a display control section 101b, and a communication control section 101c. The parameter generating section 101a generates imaging parameters when an instruction for the imaging parameters is input by the touch panel of the display section 108 being operated in a state where an image corresponding to the imaging data generated by the imaging element of the imaging section 106 is displayed on the display section 108. The display control section 101b causes the display section 108 to display the image corresponding to the imaging data generated by the imaging element of the imaging section 106 before the wireless communication circuit section 104 starts the wireless reception of imaging data (second imaging data) wirelessly transmitted from the camera 200. In addition, after the wireless communication circuit section 104 starts the wireless reception of the imaging data wirelessly transmitted from the camera 200, the display control section 101b displays an image, corresponding to imaging data wirelessly received by the wireless communication circuit section 104, on the display section 108. The communication control section 101c causes the wireless communication circuit section 104 to wirelessly transmit the imaging parameters generated by the parameter generating section 101a to the camera 200, and to wirelessly receive the imaging data wirelessly transmitted from the camera 200.

The functions of the parameter generating section 101a, the display control section 101b, and the communication control section 101c are realized as software functions by a computer (CPU) of the camera operating terminal 100 reading and executing, for example, a program stored in the ROM 102. In addition, the program may be provided by a "computer-readable recording medium" such as, for example, a flash memory. In addition, the above-mentioned program may be input to the camera operating terminal 100 by transmitting the program from a computer having the program stored in a storage device or the like through a transmission medium or through transmitted waves in the transmission medium to the camera operating terminal 100. Here, the "transmission medium" that transmits a program is a medium having a function of transmitting information like networks (communication networks) such as the Internet or communication channels (communication lines) such as a telephone line. In addition, the above-mentioned program may realize a portion of the above-mentioned functions. Further, the above-mentioned program may be a so-called difference file (difference program) capable of realizing the above-mentioned function by a combination with a program which is already recorded in a computer.

The terminal including the control section 101, the wireless communication circuit section 104, the imaging section 106, and the display section 108 as a minimum configuration corresponds to an aspect of the camera operating terminal of the present invention. For example, the control section 101 corresponds to a parameter control section, a display control section, and a communication control section in the camera operating terminal of the present invention, the wireless communication circuit section 104 corresponds to a communication interface in the camera operating terminal of the present invention, the imaging section 106 corresponds to an imaging element in the camera operating terminal of the present invention, and the display section 108 corresponds to a display interface and an operation interface in the camera operating terminal of the present invention.

Figure 3:
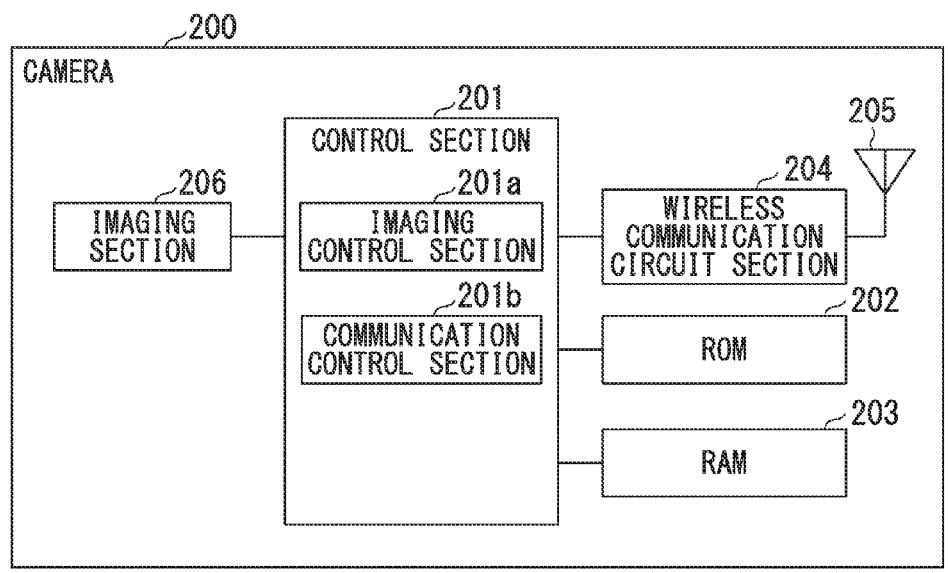
FIG. 3 is a block diagram illustrating a configuration of a camera according to the first embodiment of the present invention.

FIG. 3 is a diagram illustrating an electrical configuration of the camera 200 according to the present embodiment. The camera 200 shown in FIG. 3 includes a control section 201, a ROM 202, a RAM 203, a wireless communication circuit section 204, an antenna 205, and an imaging section 206, which are connected to each other as shown in the drawing.

The control section 201 operates according to a program stored in the ROM 202, and controls the operation sequence of the camera 200. The ROM 202 is a nonvolatile memory such as a flash ROM, and various setting information including communication setting parameters and program data for controlling the camera 200 is stored in the ROM 202.

The RAM 203 is used as a work area used in the arithmetic operation or the like of the control section 201, and is an area for temporarily storing various setting information or the like. The wireless communication circuit section 204 and the antenna 205 are configured to perform wireless communication with the camera operating terminal 100. The wireless communication circuit section 204 is a communication interface (communication module) which is constituted by a high-frequency circuit section required for wireless communication, an encoding and decoding circuit section, a buffer memory, and the like. The antenna 205 is connected to the wireless communication circuit section 204. As described above, in the present embodiment, as an example of a wireless communication system, a wireless system such as a wireless LAN (IEEE 802.11) is used.

The imaging section 206 is constituted by a lens that images incident light, an imaging element (such as CCD or CMOS sensor) having a photoelectric converter that converts imaged light into an electrical signal, an AD converter (analog-digital converter) that converts an analog electrical signal which is output from the imaging element into a digital electrical signal, and the like. With such a configuration, the imaging section 206 generates imaging data of a visual field range. Whenever imaging data of one frame can be read out, the imaging section 206 notifies the control section 201 that the imaging data is prepared on the basis of an interrupt. The control section 201 reads out the imaging data from the imaging section 206, performs required image processing appropriately, and stores the imaging data after image processing in a predetermined area of the RAM 203. As described above, in a state where the camera operating terminal 100 and the camera 200 are fixed to each other, the visual field range of the imaging element included in the imaging section 206 is adjusted so as to overlap at least a portion of the visual field range of the imaging element of the camera operating terminal 100.

More specifically, the control section 201 realizes at least functions of an imaging control section 201a and a communication control section 201b. When the wireless communication circuit section 204 wirelessly receives imaging parameters from the camera operating terminal 100, the imaging control section 201a sets the imaging parameters received by the wireless communication circuit section 204 in the imaging element of the imaging section 206, and controls the operation of the imaging element. The communication control section 201b causes the wireless communication circuit section 204 to wirelessly receive the imaging parameters wirelessly transmitted from the camera operating terminal 100. In addition, the communication control section 201b causes the wireless communication circuit section to wirelessly transmit imaging data generated by the imaging element in which default imaging parameters are set at the time of the startup of the camera 200, and imaging data generated by the imaging element in which the imaging parameters received by the wireless communication circuit section 204 are set, to the camera operating terminal 100.

The functions of the imaging control section 201a and the communication control section 201b are realized as software functions by a computer (CPU) of the camera 200 reading and executing, for example, a program stored in the ROM 202. A configuration for realizing the program is the same as a configuration for realizing the program for realizing the functions of the parameter generating section 101a, the display control section 101b, and the communication control section 101c of the camera operating terminal 100.

The terminal including the control section 201, the wireless communication circuit section 204, and the imaging section 206 as a minimum configuration corresponds to an aspect of the camera of the present invention. For example, the control section 101 corresponds to an imaging control section and a communication control section in the camera of the present invention, the wireless communication circuit section 104 corresponds to a communication interface in the camera of the present invention, and the imaging section 106 corresponds to an imaging element in the camera of the present invention.

In the present embodiment, before the wireless reception of the imaging data wirelessly transmitted from the camera 200 is started (before the imaging data is wirelessly transmitted from the camera 200), the camera operating terminal 100 displays an image captured by the imaging section 106 of the camera operating terminal 100 on the display section 108. In addition, the camera operating terminal 100 generates imaging parameters when an instruction for settings of the imaging parameters is input by the touch panel of the display section 108 being operated in a state where the image captured by the imaging section 106 of the camera operating terminal 100 is displayed on the display section 108.

Thereby, before the camera operating terminal 100 and the camera 200 start data communication, it is possible to start an operation for performing settings for imaging (settings of imaging parameters). Therefore, immediately after power is turned on, it is possible to shorten the time until performing image capturing after the completion of wireless connection and the enabling of data transmission.

The imaging parameters generated by the camera operating terminal 100 are wirelessly transmitted to the camera 200. The camera 200 wirelessly receives the imaging parameters, and sets the imaging parameters in the imaging element of the imaging section 206. Thereby, the settings for imaging which a user instructs the camera operating terminal 100 to perform can be reflected in the camera 200.

Next, operations of the camera operating terminal 100 will be described. FIGS. 4 to 8 are diagrams illustrating operations of the camera operating terminal 100. When the camera operating terminal 100 is powered on, the control section 101 initializes each functional block of the camera operating terminal 100 (step S101). In this case, the control section 101 reads out default imaging parameters from the ROM 102, and sets the parameters in the imaging element of the imaging section 106.

Subsequently, the control section 101 sets a connection flag stored in the RAM 103 to "unconnected" (step S102). The connection flag is information indicating a connection state regarding data communication between the camera operating terminal 100 and the camera 200. There are the following three states of the connection state.

(1) Unconnected: state before the connection operation between the camera operating terminal 100 and the camera 200 is performed (2) In connection operation: state where the connection operation between the camera operating terminal 100 and the camera 200 is being performed (3) Connected: state where the camera operating terminal 100 and the camera 200 are wirelessly connected to each other After the setting of the connection flag, the control section 101 determines whether the connection flag is "unconnected" (step S110). When the connection flag is not "unconnected", the control section 101 performs a process of step S120 described later. In addition, when the connection flag is "unconnected", the control section 101 sets the connection flag to "in connection operation" (step S111). After the setting of the connection flag, the control section 101 (communication control section 101c) controls the wireless communication circuit section 104, and causes the wireless communication circuit section to wirelessly transmit a connection request message to the camera 200 (step S112). The connection request message is a message for requesting connection for the reception of data from a connection counterpart of wireless communication. In addition, communication connection parameters such as a SSID and a MAC address of the camera 200 targeted for connection are set in advance by the operation of the touch panel of the display section 108.

After the transmission of the connection request message, the control section 101 determines whether the connection flag is "in connection operation" (step S120). When the connection flag is not "in connection operation", the control section 101 performs a process of step S130 described later. In addition, when the connection flag is "in connection operation", the control section 101 transmits the connection request message and then determines whether a predetermined time has elapsed (step S121).

When a predetermined time has elapsed, the control section 101 sets the connection flag to "unconnected" (step S122). After the setting of the connection flag, the control section 101 (display control section 101b) causes the display section 108 to display a message or the like for reporting to a user that an error is generated (step S123). In the present embodiment, the report to a user is performed by the display of a message or the like, but the report to a user may be performed by the turn-on or turn-on-and-off of an LED included in the operation section 107, and the report to a user may be performed by a voice. After a message or the like for reporting to a user that an error is generated is displayed, the control section 101 performs the process of step S130 described later.

In addition, when a predetermined time has not elapsed, the control section 101 (communication control section 101c) monitors wireless communication which is performed by the wireless communication circuit section 104, and determines whether a connection request response message which is a response to the connection request message is received (step S124). When the connection request response message is received, a wireless connection to the camera 200 is established. In this case, the control section 101 sets the connection flag to "connected" (step S125). After the setting of the connection flag, the control section 101 (communication control section 101c) controls the wireless communication circuit section 104, and causes the wireless communication circuit section to wirelessly transmit the imaging parameters to the camera 200 (step S126).

Figure 7:
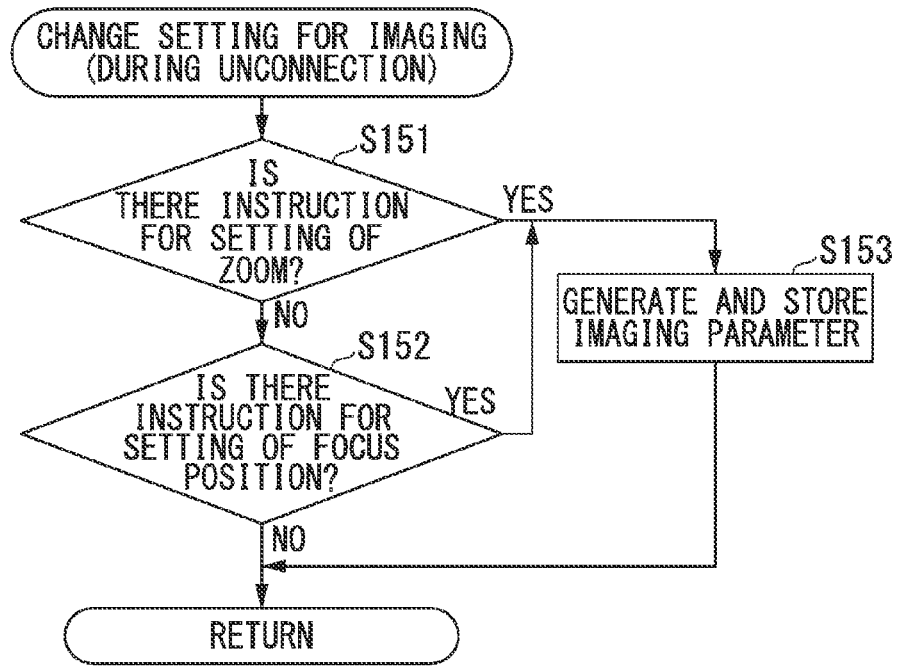
FIG. 7 is a flow diagram illustrating a procedure of operations of the camera operating terminal according to the first embodiment of the present invention.

The imaging parameters transmitted to the camera 200 in step S126 are imaging parameters generated in step S153 of FIG. 7. The process performed in step S153 will be described later.

After the transmission of the imaging parameters, the control section 101 performs the process of step S130 described later. In addition, even when the connection request response message is not received, the control section 101 performs the process of step S130.

Figure 5:
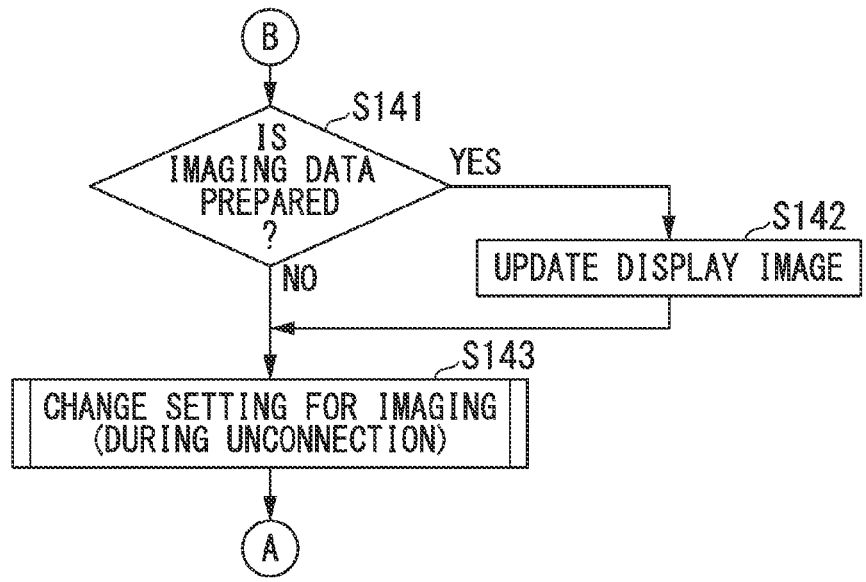
FIG. 5 is a flow diagram illustrating a procedure of operations of the camera operating terminal according to the first embodiment of the present invention.
Figure 6:
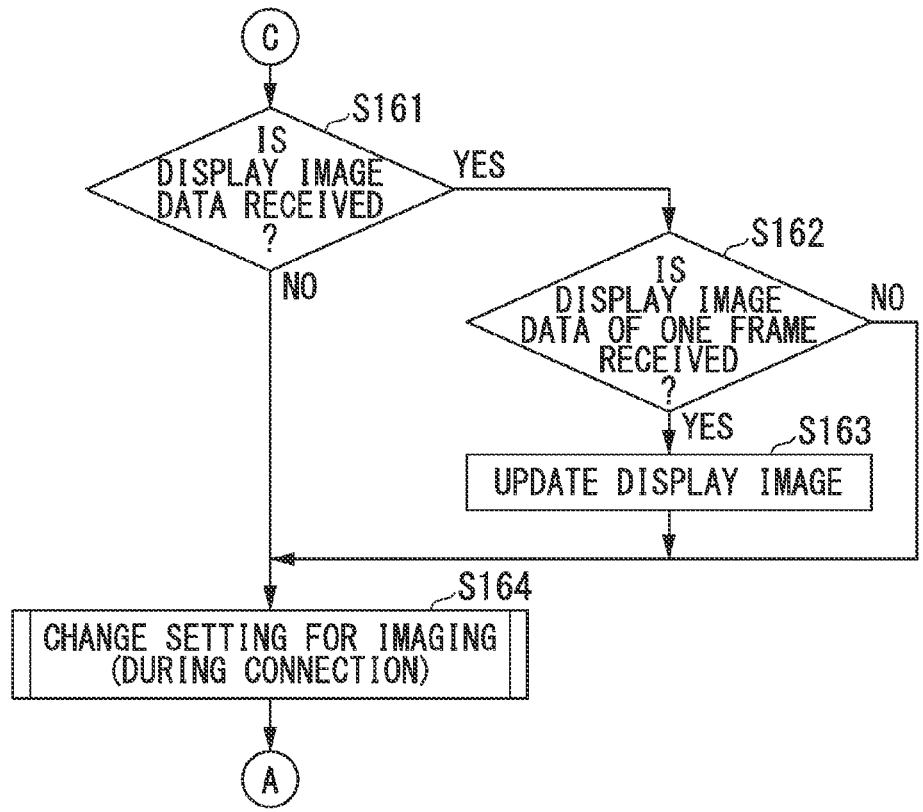
FIG. 6 is a flow diagram illustrating a procedure of operations of the camera operating terminal according to the first embodiment of the present invention.

When the connection flag is not "in connection operation" in step S120, when a message regarding an error is displayed in step S123, when the imaging parameters are wirelessly transmitted in step S126, or when the connection request response message is not received in step S124, the control section 101 determines whether the connection flag is "connected" (step S130). When the connection flag is not "connected", processes shown in FIG. 5 are performed. When the connection flag is "connected", processes shown in FIG. 6 are performed.

When the connection flag is not "connected", the control section 101 determines whether readable imaging data is prepared in the imaging section 106 (step S141). When the imaging data is not prepared, the control section 101 performs a process of step S143 described later. In addition, when the imaging data is prepared, the control section 101 (display control section 101b) causes the display section 108 to display an image based on the imaging data (step S142). Thereby, the image corresponding to the imaging data generated in the imaging section 106 of the camera operating terminal 100 is displayed. A process of step S142 is repeatedly performed at a predetermined time interval until the wireless connection to the camera 200 is established, and a live-view display is performed by displaying an image.

After the display of an image, the control section 101 performs a process of changing the settings for imaging (step S143). Thereafter, the control section 101 performs a process of step S110.

FIG. 7 is a diagram illustrating the details of the process (step S143) of changing the settings for imaging. The control section 101 monitors a user's operation of the touch panel of the display section 108, and determines whether an instruction to perform settings for a zoom is input (step S151). When the instruction to perform the settings for a zoom is input, the control section 101 (parameter generating section 101a) generates imaging parameters for a zoom, and stores the generated imaging parameters in the RAM 103 (step S153).

When a process of step S153 is performed two times or more, the imaging parameters are already stored in the RAM 103 in step S153 after the second process. In this case, the generation of the imaging parameters in step S153 also includes a process of changing imaging parameters which are previously generated. When the values of the imaging parameters after change are different from the values of the imaging parameters before change, it can be said that the imaging parameters different from the imaging parameters before change are generated.

When the instruction to perform the settings for a zoom is not input, the control section 101 monitors the user's operation of the touch panel of the display section 108, and determines whether an instruction to perform settings for a focus position is input (step S152). When the instruction to perform the settings for the focus position is input, the control section 101 (parameter generating section 101a) generates imaging parameters for the focus position, and stores the generated imaging parameters in the RAM 103 (step S153).

While processes of steps S151 to S153 are performed, an image based on the imaging data generated in the imaging section 106 of the camera operating terminal 100 is displayed on the display section 108. The settings of the imaging parameters are performed by a user operating the touch panel to input an instruction to specify values of the imaging parameters, for example, in a state where the imaging parameters are displayed on the display section 108. A user may operate buttons or the like of the operation section 107 to input the instruction to specify the values of the imaging parameters.

Parameters for the settings of the visual field range of the imaging element are generated by the processes of steps S151 to S153. In the present embodiment, the imaging parameters for a zoom and a focus position are generated, but other imaging parameters may be generated. For example, imaging parameters for an aperture value, a shutter speed, a white balance and the like may be generated.

When the connection flag is "connected" in step S130, the control section 101 (communication control section 101c) monitors the wireless communication performed by the wireless communication circuit section 104, and determines whether display image data is received (step S161). The display image data is imaging data generated in the imaging section 206 of the camera 200, and is imaging data for displaying an image. The display image data of one frame is wirelessly transmitted in a plurality of packages. In step S161, whether the display image data of one package is received is determined.

When the display image data is not received, the control section 101 performs a process of step S164 described later. In addition, when the display image data is received, the control section 101 (communication control section 101c) monitors the wireless communication performed by the wireless communication circuit section 104, and determines whether the display image data of one frame is received (step S162). When the display image data of one frame is not received, the control section 101 performs the process of step S164 described later. In addition, when the display image data of one frame is received, the control section 101 (display control section 101b) performs the extension or the like of the display image data, and then causes the display section 108 to display an image based on the display image data (step S163). Thereby, an image corresponding to the imaging data generated in the imaging section 206 of the camera 200 is displayed. A process of step S163 is repeatedly performed at a predetermined time interval after the wireless connection to the camera 200 is established, and a live-view display is performed by displaying an image.

After the display of an image, the control section 101 performs a process of changing the settings for imaging (step S164). Thereafter, the control section 101 performs the process of step S110.

Figure 8:
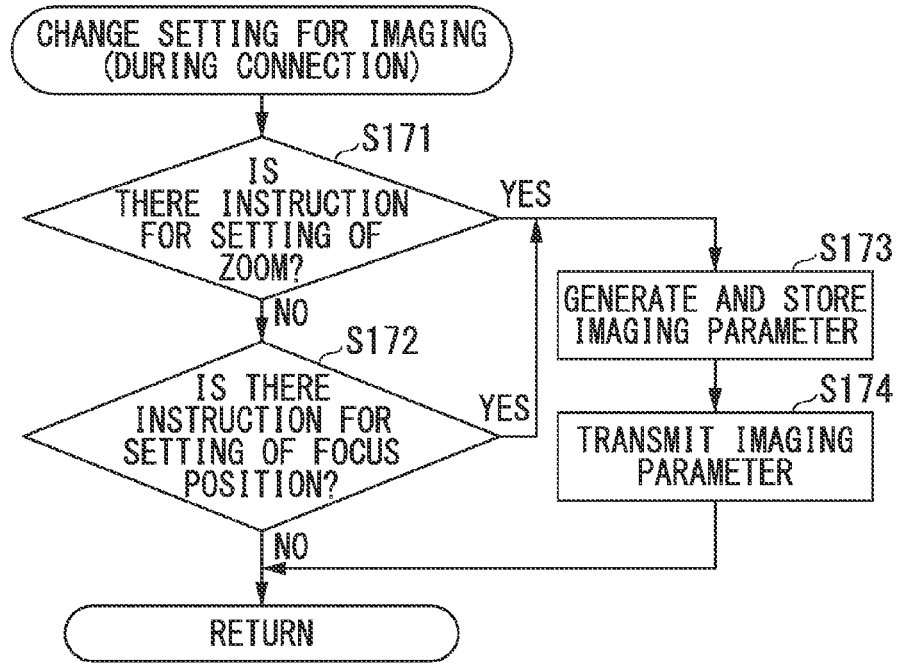
FIG. 8 is a flow diagram illustrating a procedure of operations of the camera operating terminal according to the first embodiment of the present invention.

FIG. 8 is a diagram illustrating the details of the process (step S164) of changing the settings for imaging. The control section 101 monitors a user's operation of the touch panel of the display section 108, and determines whether an instruction to perform settings for a zoom is input (step S171). When the instruction to perform the settings for a zoom is input, the control section 101 (parameter generating section 101a) generates imaging parameters for a zoom, and stores the generated imaging parameters in the RAM 103 (step S173).

When a process of step S173 is performed two times or more, the imaging parameters are already stored in the RAM 103 in step S173 after the second process. In this case, the generation of the imaging parameters in step S173 also includes a process of changing imaging parameters which are previously generated. When the values of the imaging parameters after change are different from the values of the imaging parameters before change, it can be said that the imaging parameters different from the imaging parameters before change are generated.

When the instruction to perform the settings for a zoom is not input, the control section 101 monitors the user's operation of the touch panel of the display section 108, and determines whether an instruction to perform settings for a focus position is input (step S172). When the instruction to perform the settings for the focus position is input, the control section 101 (parameter generating section 101a) generates imaging parameters for the focus position, and stores the generated imaging parameters in the RAM 103 (step S173). After the storage of the imaging parameters, the control section 101 (communication control section 101c) controls the wireless communication circuit section 104, and causes the wireless communication circuit section to wirelessly transmit the imaging parameters to the camera 200 (step S174).

While processes of steps S171 to S174 are performed, an image based on the imaging data (display image data) generated in the imaging section 206 of the camera 200 is displayed on the display section 108. The settings of the imaging parameters are performed by a user operating the touch panel to input an instruction to specify values of the imaging parameters, for example, in a state where the imaging parameters are displayed on the display section 108. The settings of the imaging parameters may be performed by a user operating buttons or the like of the operation section 107 to input the instruction to specify the values of the imaging parameters.

Parameters for the settings of the visual field range of the imaging element are generated by the processes of steps S171 to S174. In the present embodiment, the imaging parameters for a zoom and a focus position are generated, but other imaging parameters may be able to be generated. For example, imaging parameters for an aperture value, a shutter speed, a white balance and the like may be generated.

As described above, before the wireless reception of the imaging data (display image data) wirelessly transmitted from the camera 200 is started (before the imaging data is wirelessly transmitted from the camera 200), the camera operating terminal 100 displays the image captured by the imaging section 106 of the camera operating terminal 100 on the display section 108 (which corresponds to step S142). In addition, the camera operating terminal 100 generates imaging parameters when an instruction for the settings of imaging parameters (instruction to perform the settings for a zoom, or the like) is input by the touch panel of the display section 108 being operated in a state where the image captured by the imaging section 106 of the camera operating terminal 100 is displayed on the display section 108 (which corresponds to step S153). The imaging parameters generated by the camera operating terminal 100 are wirelessly transmitted to the camera 200 (which corresponds to step S126).

In addition, after the wireless reception of the imaging data wirelessly transmitted from the camera 200 is started, the camera operating terminal 100 displays an image captured by the imaging section 206 of the camera 200 on the display section 108 (which corresponds to step S163). Therefore, an image displayed on the camera operating terminal 100 switches from the image captured by the imaging section 106 of the camera operating terminal 100 to the image captured by the imaging section 206 of the camera 200. In addition, the camera operating terminal 100 generates imaging parameters when the instruction for the settings of imaging parameters (instruction to perform the settings for a zoom, or the like) is input by the touch panel of the display section 108 being operated in a state where the image captured by the imaging section 206 of the camera 200 is displayed on the display section 108 (which corresponds to step S173). The imaging parameters generated by the camera operating terminal 100 are wirelessly transmitted to the camera 200 (which corresponds to step S174).

Figure 9:
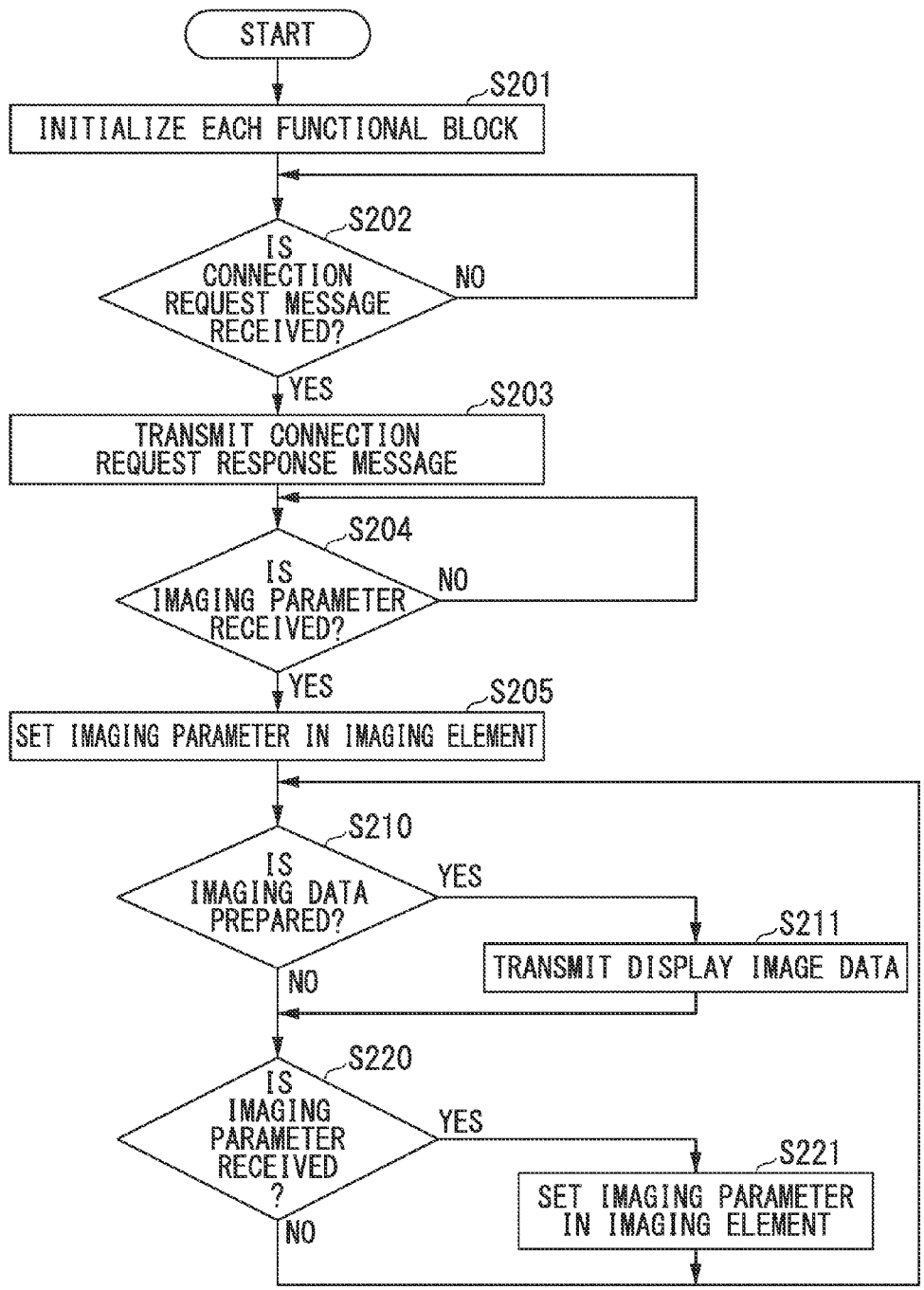
FIG. 9 is a flow diagram illustrating a procedure of operations of the camera according to the first embodiment of the present invention.

Next, operations of the camera 200 will be described. FIG. 9 is a diagram illustrating operations of the camera 200. When the camera 200 is powered on, the control section 201 initializes each functional block of the camera 200 (step S201). In this case, the control section 201 (imaging control section 201a) reads out the default imaging parameters from the ROM 202, and sets the parameters in the imaging element of the imaging section 206.

Subsequently, the control section 201 (communication control section 201b) monitors a wireless communication performed by the wireless communication circuit section 204, and determines whether a connection request message is received (step S202). When the connection request message is not received, the control section 201 (communication control section 201b) continues the monitoring of the wireless communication performed by the wireless communication circuit section 204 and the determination of whether the connection request message is received.

When the connection request message is received, the control section 201 (communication control section 201b) controls the wireless communication circuit section 204, and causes the wireless communication circuit section to wirelessly transmit to a connection request response message to the camera operating terminal 100 (step S203). When the connection request response message is transmitted, a wireless connection to the camera operating terminal 100 is established. After the transmission of the connection request response message, the control section 201 (communication control section 201b) monitors the wireless communication performed by the wireless communication circuit section 204, and determines whether imaging parameters are received (step S204). When the imaging parameters are not received, the control section 201 (communication control section 201b) continues the monitoring of the wireless communication performed by the wireless communication circuit section 204 and the determination of whether the imaging parameters are received.

When the imaging parameters are received, the control section 201 (imaging control section 201a) sets the received imaging parameters in the imaging element of the imaging section 206 (step S205). After the settings of the imaging parameters, the control section 201 determines whether readable imaging data is prepared in the imaging section 206 (step S210). When the imaging data is not prepared, the control section 201 performs a process of step S220 described later.

When the imaging data is prepared, the control section 201 performs a process such as compression on the imaging data to generate display image data. In addition, the control section 201 (communication control section 201b) controls the wireless communication circuit section 204, and causes the wireless communication circuit section to wirelessly transmit the display image data to the camera operating terminal 100 (step S211).

After the transmission of the display image data, the control section 201 (communication control section 201b) monitors the wireless communication performed by the wireless communication circuit section 204, and determines whether the imaging parameters are received (step S220). When the imaging parameters are not received, the control section 201 performs a process of step S210. In addition, when the imaging parameters are received, the control section 201 (imaging control section 201a) sets the received imaging parameters in the imaging element of the imaging section 206 (step S221). After the settings of the imaging parameters, the control section 201 performs the process of step S210.

As described above, the camera 200 wirelessly receives the imaging parameters wirelessly transmitted from the camera operating terminal 100 (which corresponds to steps S204 and S220), and sets the imaging parameters in the imaging element of the imaging section 206 (which corresponds to steps S205 and S221). In addition, after the wireless connection to the camera operating terminal 100 is established, the camera 200 wirelessly transmits the display image data based on the imaging data generated in the imaging section 206 to the camera operating terminal 100 (step S211).

As described above, according to the present embodiment, before the camera operating terminal 100 and the camera 200 start data communication, it is possible to start an operation for performing settings for imaging (settings of imaging parameters). Therefore, immediately after power is turned on, it is possible to shorten the time until performing image capturing after the completion of the wireless connection and the enabling of data transmission.

When the camera operating terminal 100 and the camera 200 perform the wireless connection and then once break off (release) the wireless connection, and perform the wireless connection again, the camera operating terminal 100 and the camera 200 may perform the operation as mentioned above. Even in this case, before the data communication is started, it is possible to start an operation for performing the settings for imaging (settings of imaging parameters).

In addition, before the wireless reception of the imaging data (display image data) wirelessly transmitted from the camera 200 is started, the imaging parameters are wirelessly transmitted to the camera 200, and the imaging parameters are set in the imaging element of the camera 200. Thereby, it is possible to further shorten the time until performing image capturing after the completion of the wireless connection and the enabling of data transmission.

(Second Embodiment)

Figure 10:
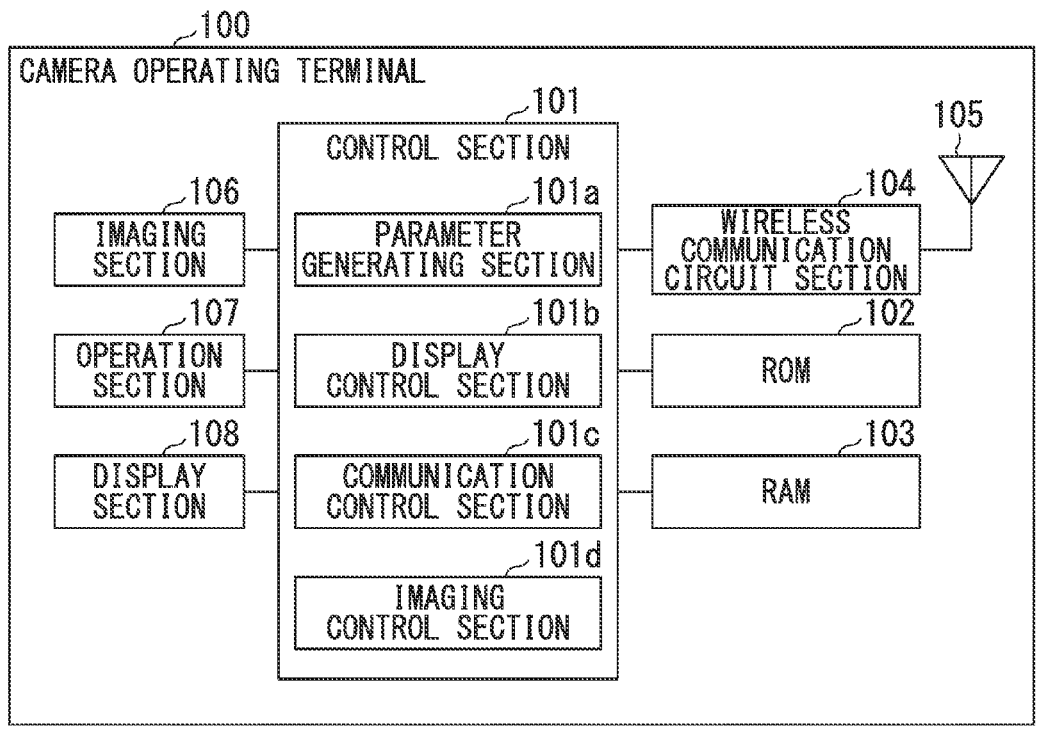
FIG. 10 is a block diagram illustrating a configuration of a camera operating terminal according to a second embodiment of the present invention.

Next, a second embodiment of the present invention will be described. FIG. 10 is a diagram illustrating a configuration of the camera operating terminal 100 according to the present embodiment. In the present embodiment, a function of an imaging control section 101d is added to the control section 101 shown in FIGS. 1A and 1B. The imaging control section 101d sets imaging parameters generated by the parameter generating section 101a in the imaging element of the imaging section 106, and controls the operation of the imaging element. The function of the imaging control section 101d may be realized as software. Configurations other than that of the imaging control section 101d are the same as the configurations shown in FIGS. 1A and 1B, and thus the description thereof will not be given. In addition, the configuration of the camera 200 according to the present embodiment is the same as the configuration shown in FIG. 2, and thus the description thereof will not be given.

Figure 11:
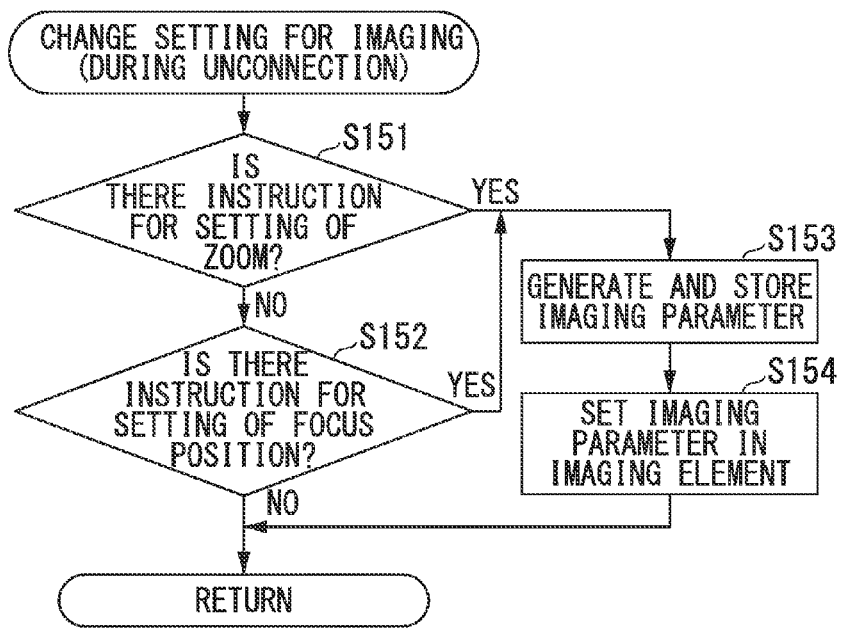
FIG. 11 is a flow diagram illustrating a procedure of operations of the camera operating terminal according to the second embodiment of the present invention.

Operations of the camera operating terminal 100 according to the present embodiment are realized by replacing the processes shown in FIG. 7 among the processes shown in FIGS. 4 to 8 with processes shown in FIG. 11. In FIG. 11, the same operations as the operations shown in FIG. 7 are denoted by the same step numbers.

In FIG. 11, after imaging parameters are generated and are stored in the RAM 203 in step S153, the control section 101 (imaging control section 101d) sets the imaging parameters stored in the RAM 203 in step S153 in the imaging element of the imaging section 106 (step S154). Thereafter, the image displayed in step S142 of FIG. 5 serves as an image to which the imaging parameters that are set in the imaging element of the imaging section 106 are applied. Operations other than the above-mentioned operations are the same as the operations shown in FIG. 7, and thus the description thereof will not be given. The operations of the camera 200 according to the present embodiment are the same as the operations shown in FIG. 9, and thus the description thereof will not be given.

According to the present embodiment, before the camera operating terminal 100 and the camera 200 start data communication, it is possible to start an operation for performing the settings for imaging (settings of imaging parameters).

In addition, a process of step S221 is performed, thereby allowing a user to confirm the image to which the set imaging parameters are applied in real time.

(Third Embodiment)

Figure 12:
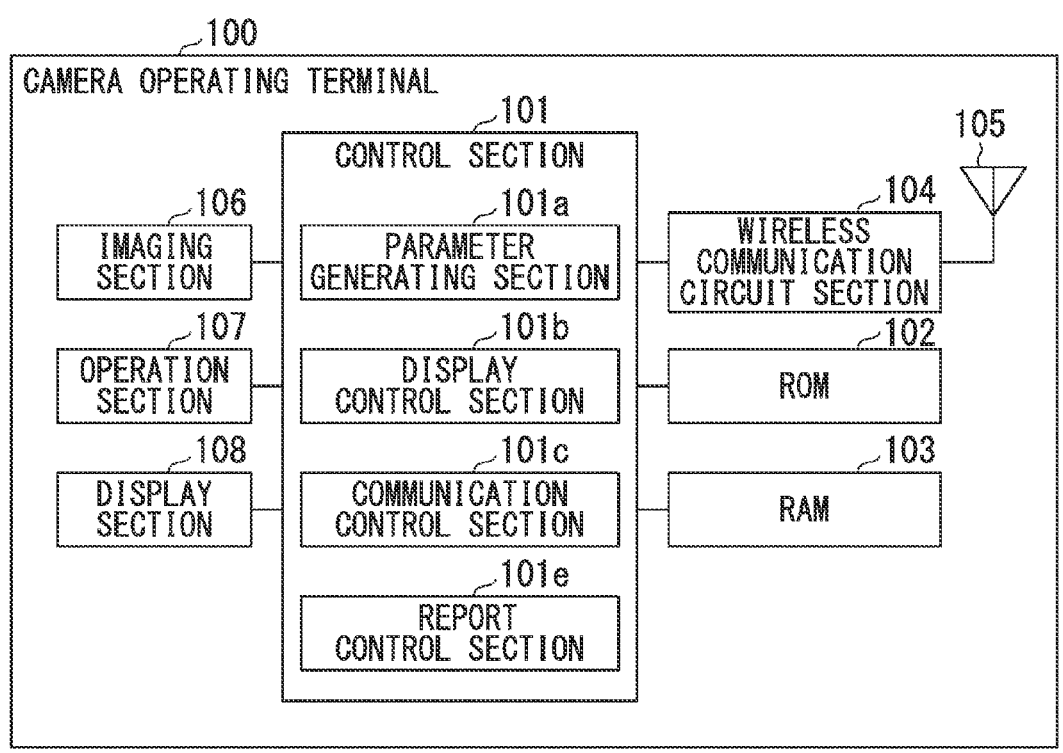
FIG. 12 is a block diagram illustrating a configuration of a camera operating terminal according to a third embodiment of the present invention.

Next, a third embodiment of the present invention will be described. FIG. 12 is a diagram illustrating a configuration of the camera operating terminal 100 according to the present embodiment. In the present embodiment, a function of a report control section 101e is added to the control section 101 shown in FIGS. 1A and 1B. When a wireless connection to the camera 200 is established, the report control section 101e performs control of reporting to a user that the camera 200 is enabled to perform imaging (storage image capturing). In addition, when an imaging instruction (storage image capturing instruction) is input by the touch panel of the display section 108 being operated before the connection of wireless communication with the camera 200 is established, the report control section 101e performs control of reporting to a user that image capturing by the camera 200 is not performed. The function of the report control section 101e may be realized as software. Configurations other than that of the report control section 101e are the same as the configurations shown in FIGS. 1A and 1B, and thus the description thereof will not be given. In addition, the configuration of the camera 200 according to the present embodiment is the same as the configuration shown in FIG. 2, and thus the description thereof will not be given.

Figure 4:
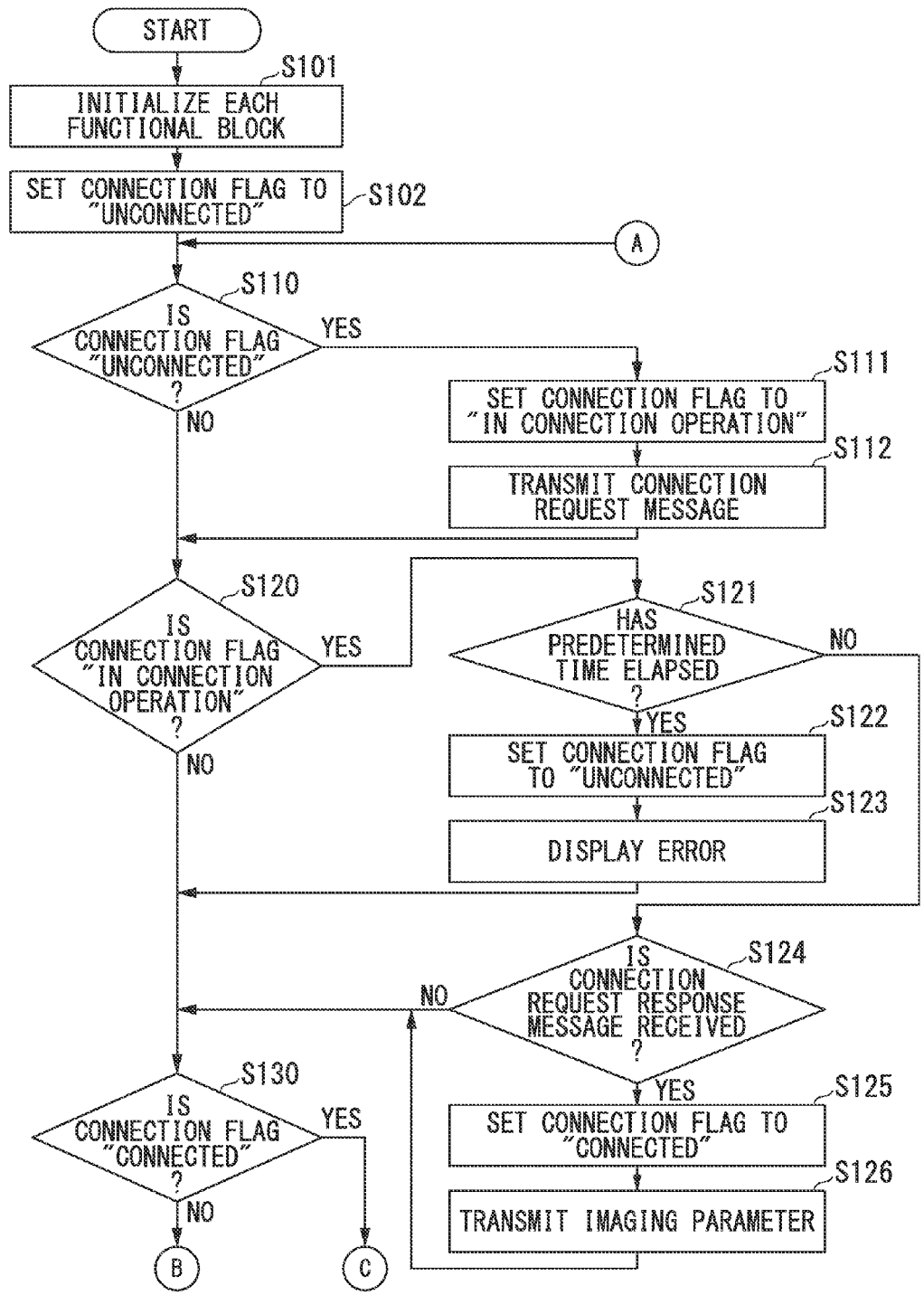
FIG. 4 is a flow diagram illustrating a procedure of operations of the camera operating terminal according to the first embodiment of the present invention.
Figure 13:
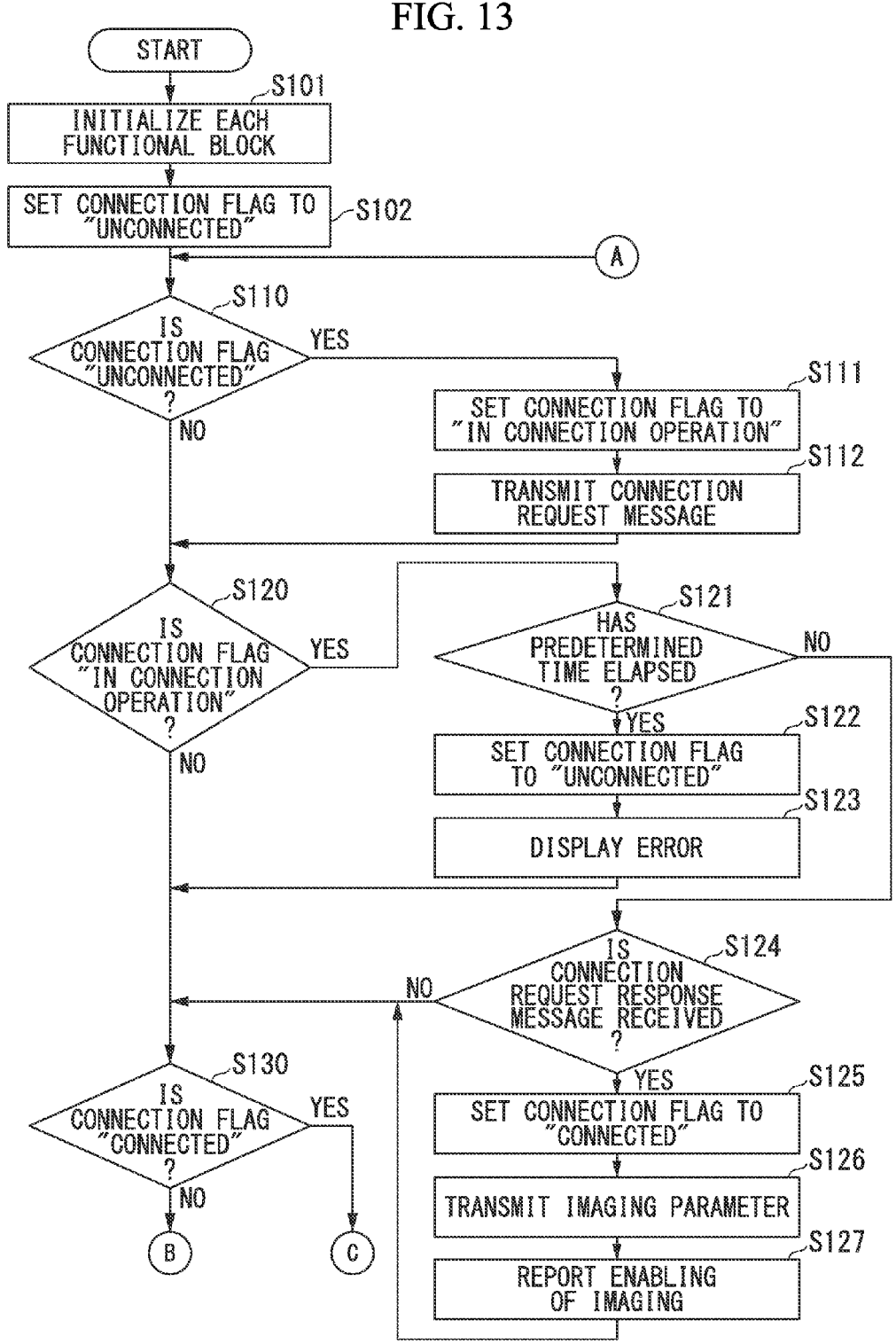
FIG. 13 is a flow diagram illustrating a procedure of operations of the camera operating terminal according to the third embodiment of the present invention.
Figure 14:
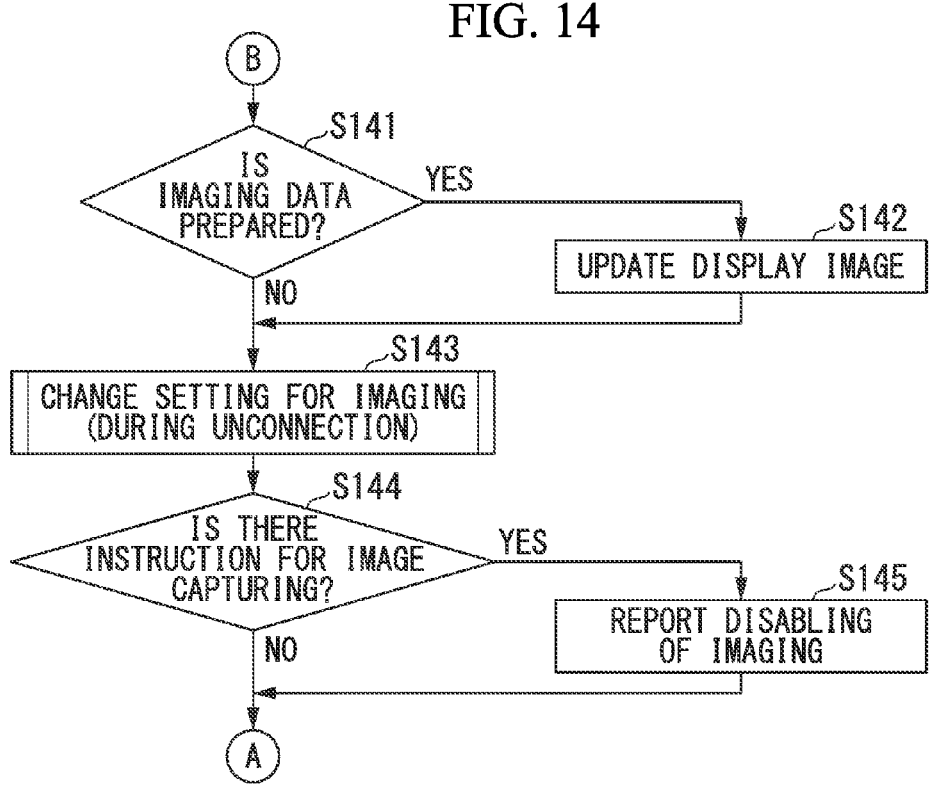
FIG. 14 is a flow diagram illustrating a procedure of operations of the camera operating terminal according to the third embodiment of the present invention.
Figure 15:
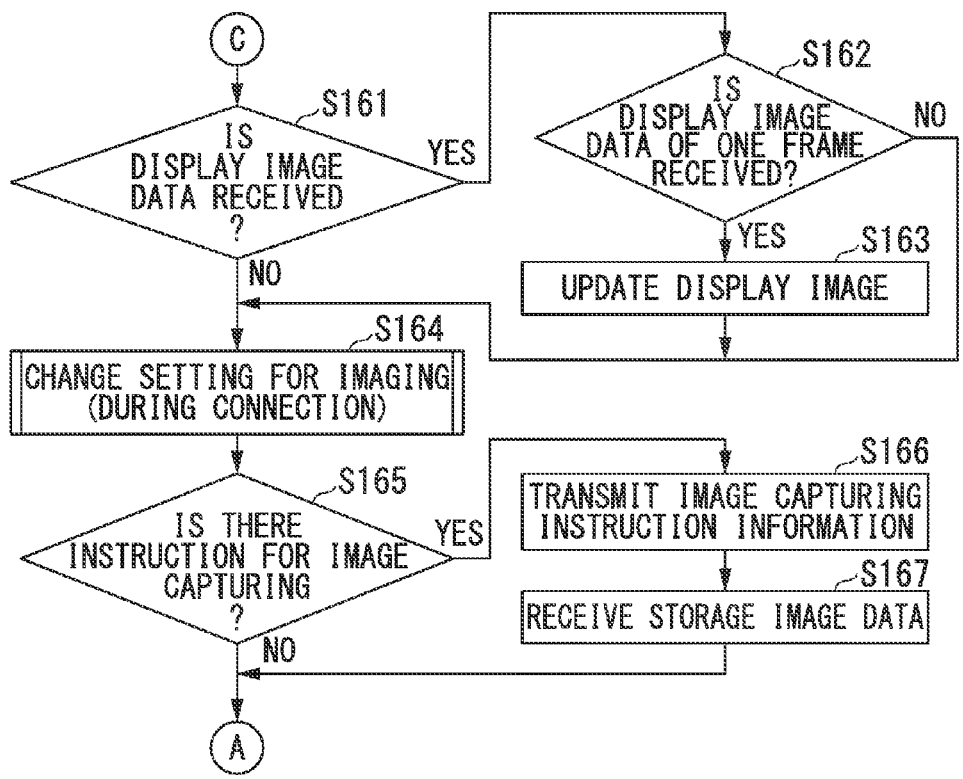
FIG. 15 is a flow diagram illustrating a procedure of operations of the camera operating terminal according to the third embodiment of the present invention.

The operations of the camera operating terminal 100 according to the present embodiment are realized by replacing the processes shown in FIG. 4 among the processes shown in FIGS. 4 to 8 with processes shown in FIG. 13, replacing the processes shown in FIG. 5 among them with processes shown in FIG. 14, and replacing the processes shown in FIG. 6 among them with processes shown in FIG. 15. In FIG. 13, the same operations as the operations shown in FIG. 4 are denoted by the same step numbers. In FIG. 14, the same operations as the operations shown in FIG. 5 are denoted by the same step numbers. In FIG. 15, the same operations as the operations shown in FIG. 6 are denoted by the same step numbers.

In FIG. 13, after the imaging parameters are transmitted to the camera 200 in step S126, the control section 101 (report control section 101e) causes the display section 108 to display a message or the like for reporting to a user that the camera 200 is enabled to perform the capturing of an image (step S127). In the present embodiment, the report to a user is performed by the display of a message or the like, but the report to a user may be performed by the turn-on or turn-on-and-off of an LED included in the operation section 107, and the report to a user may be performed by a voice. After the display of a message or the like for reporting to a user that the camera 200 is enabled to perform the capturing of an image, the control section 101 performs the process of step S130. Operations other than the above-mentioned operations are the same as the operations shown in FIG. 4, and thus the description thereof will not be given.

In FIG. 14, after the process of changing the settings for imaging (step S143) is performed, the control section 101 monitors a user's operation of the touch panel of the display section 108, and determines whether an image capturing instruction is input (step S144). When the image capturing instruction is not input, the control section 101 performs the process of step S110.

When the image capturing instruction is input, the control section 101 (report control section 101e) causes the display section 108 to display a message or the like for reporting to a user that the capturing of an image by the camera 200 is not performed (step S145). After the display of the message or the like for reporting to a user that the capturing of an image by the camera 200 is not performed, the control section 101 performs the process of step S110. Operations other than the above-mentioned operations are the same as the operations shown in FIG. 5, and thus the description thereof will not be given.

In FIG. 15, after the process (step S164) of changing the settings for imaging is performed, the control section 101 monitors a user's operation of the touch panel of the display section 108, and determines whether the image capturing instruction is input (step S165). When the image capturing instruction is not input, the control section 101 performs the process of step S110.

When the image capturing instruction is input, the control section 101 (communication control section 101c) controls the wireless communication circuit section 104, and causes the wireless communication circuit section to wirelessly transmit image capturing instruction information indicating the image capturing instruction to the camera 200 (step S166). After the transmission of the image capturing instruction information, the control section 101 (communication control section 101c) controls the wireless communication circuit section 104, and causes the wireless communication circuit section to wirelessly receive storage image data which is transmitted from the camera 200 (step S167). The storage image data and the display image data are different from each other in, for example, the size (number of pixels) of an image.

When the camera operating terminal 100 has a memory, or when an external memory is mounted to the camera operating terminal 100, the storage image data which is wirelessly received in step S167 may be stored in the memory. Alternatively, the storage image data which is wirelessly received in step S167 may be transmitted to another terminal having a storage function. Operations other than the above-mentioned operations are the same as the operations shown in FIG. 6, and thus the description thereof will not be given.

Figure 16:
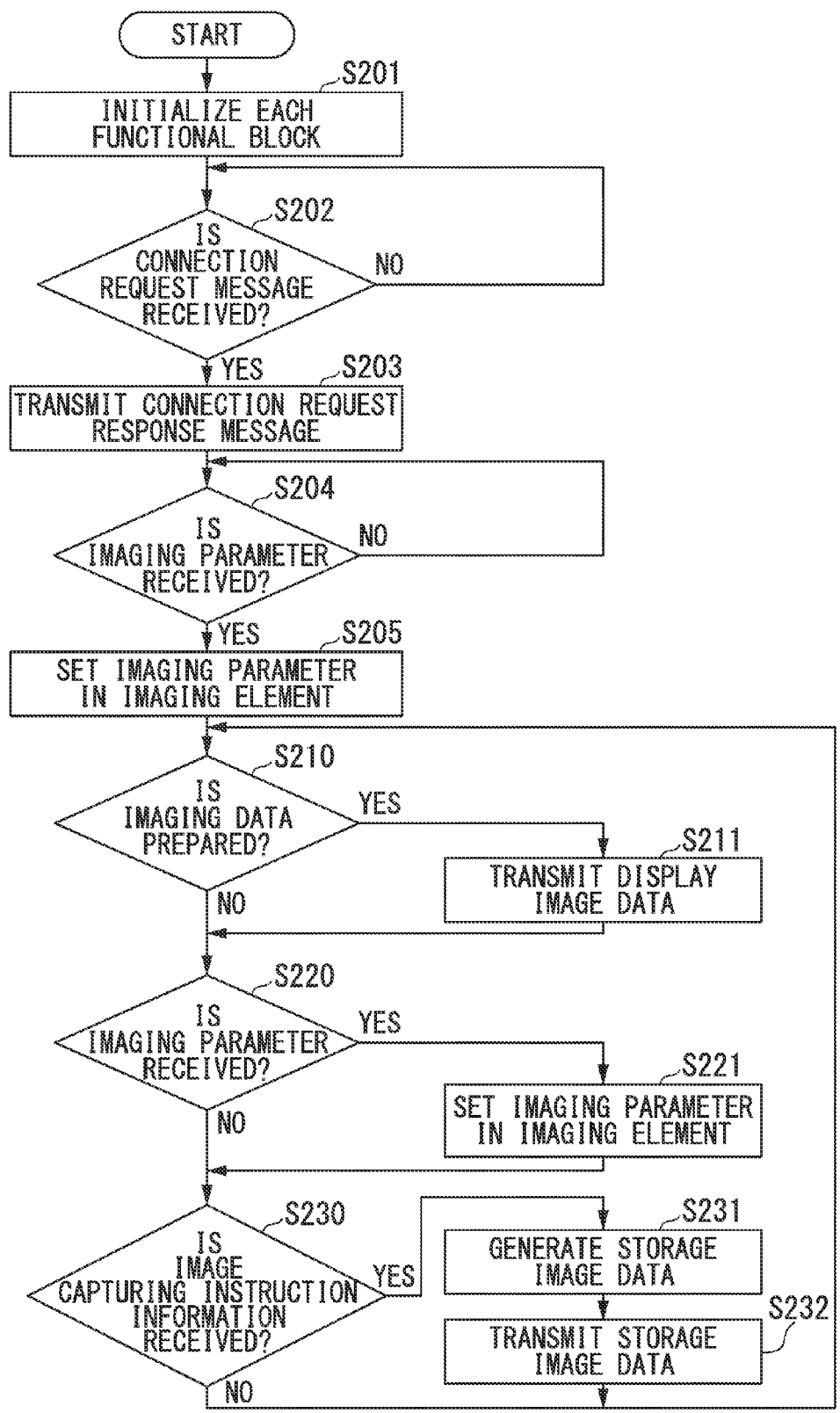
FIG. 16 is a flow diagram illustrating a procedure of operations of a camera according to the third embodiment of the present invention.

The operations of the camera 200 according to the present embodiment are realized by replacing the processes shown in FIG. 9 with processes shown in FIG. 16. In FIG. 16, the same operations as the operations shown in FIG. 9 are denoted by the same step numbers.

In FIG. 16, when the imaging parameters are not received in step S220, or when the imaging parameters are set in the imaging element of the imaging section 206 in step S221, the control section 201 (communication control section 201b) monitors the wireless communication performed by the wireless communication circuit section 204, and determines whether the image capturing instruction information is received (step S230). When the image capturing instruction information is not received, the control section 201 performs the process of step S210.

When the image capturing instruction information is received, the control section 201 (imaging control section 201a) controls the imaging section 206, and causes the imaging section to perform image capturing for generating the storage image data. When imaging data is generated by the imaging section 206, the control section 201 performs a process such as compression on the imaging data to generate the storage image data (step S231). After the generation of the storage image data, the control section 201 (communication control section 201b) controls the wireless communication circuit section 204, and causes the wireless communication circuit section to wirelessly transmit the storage image data to the camera operating terminal 100 (step S232). After the transmission of the storage image data, the control section 201 performs the process of step S210. Operations other than the above-mentioned operations are the same as the operations shown in FIG. 9, and thus the description thereof will not be given.

Processes of steps S165 to S167 of FIG. 15 may be added to the processes shown in FIG. 6, and processes of steps S230 to S232 of FIG. 16 may be added to the processes shown in FIG. 9. In addition, in the present embodiment, the processes shown in FIG. 7 may be replaced with the processes shown in FIG. 11.

According to the present embodiment, before the camera operating terminal 100 and the camera 200 start the data communication, it is possible to start an operation for performing the settings for imaging (settings of imaging parameters).

In addition, the process of step S127 is performed, thereby allowing a user to recognize that the camera 200 is enabled to perform imaging (storage image capturing). Further, the process of step S145 is performed, thereby allowing a user to recognize that the imaging instruction is not effective when the wireless connection between the camera operating terminal 100 and the camera 200 are not established.

In addition, the process of step S166 is performed, thereby allowing the image capturing operation (storage image capturing operation) of the camera 200 to be controlled from the camera operating terminal 100.

(Fourth Embodiment)

Figure 17:
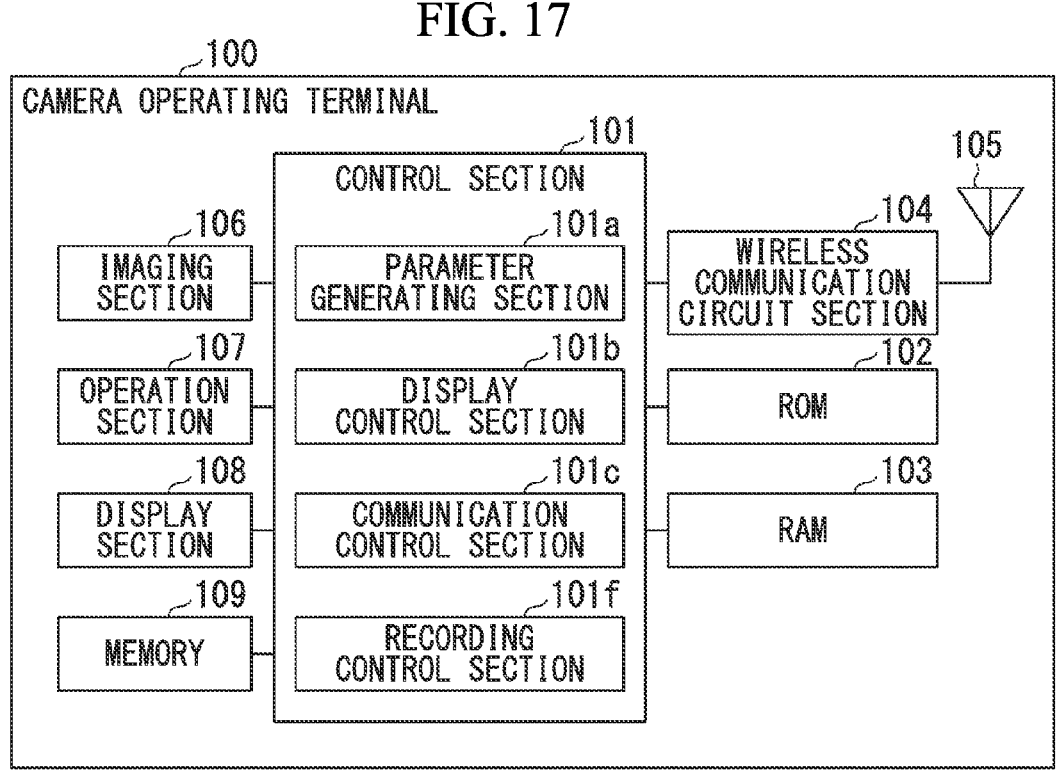
FIG. 17 is a block diagram illustrating a configuration of a camera operating terminal according to a fourth embodiment of the present invention.

Next, a fourth embodiment of the present invention will be described. FIG. 17 is a diagram illustrating a configuration of a camera operating terminal 100 according to the present embodiment. In the present embodiment, a function of a recording control section 101f is added to that of the control section 101 shown in FIGS. 1A and 1B, and a memory 109 is added to the configuration shown in FIGS. 1A and 1B. When the imaging instruction is input by the touch panel of the display section 108 being operated before the connection of wireless communication with the camera 200 is established, the recording control section 101f records the imaging data generated by the imaging element of the imaging section 106 in the memory 109. The function of the recording control section 101f may be realized as software. Configurations other than those of the recording control section 101f and the memory 109 are the same as the configurations shown in FIGS. 1A and 1B, and thus the description thereof will not be given. In addition, the configuration of the camera 200 according to the present embodiment is the same as the configuration shown in FIG. 2, and thus the description thereof will not be given.

Figures 18, 19:
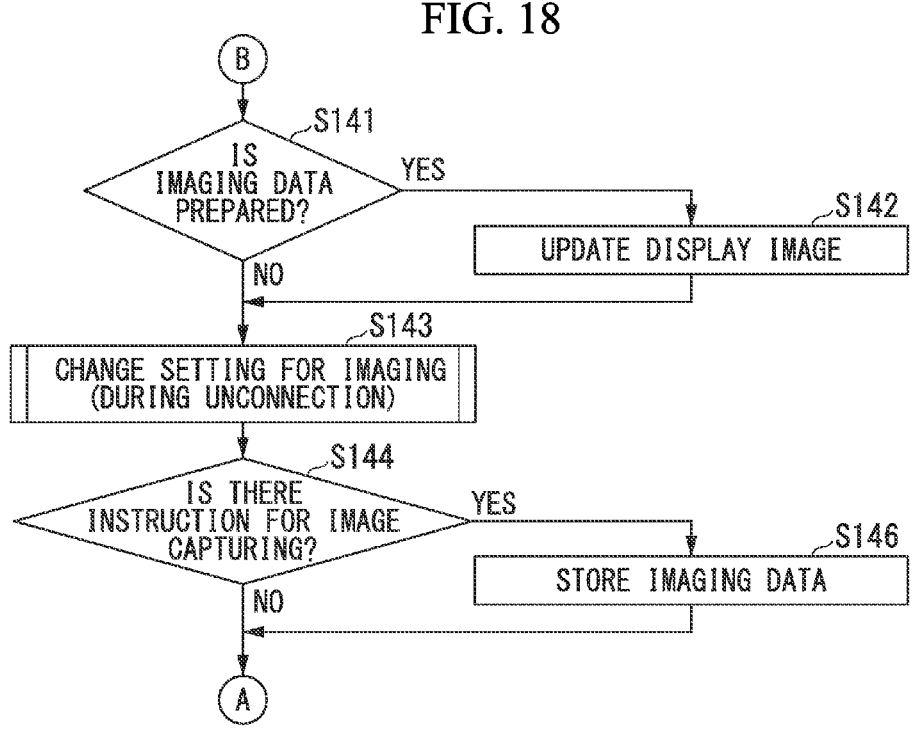
FIG. 18 is a flow diagram illustrating a procedure of operations of the camera operating terminal according to the fourth embodiment of the present invention.
FIG. 19 is a reference diagram illustrating imaging parameters stored in a ROM of a camera operating terminal according to a fifth embodiment of the present invention.

The operations of the camera operating terminal 100 according to the present embodiment are realized by replacing the processes shown in FIG. 5 among the processes shown in FIGS. 4 to 8 with processes shown in FIG. 18. In FIG. 18, the same operations as the operations shown in FIG. 5 are denoted by the same step numbers.

In FIG. 18, after the process of changing the settings for imaging (step S143) is performed, the control section 101 monitors a user's operation of the touch panel of the display section 108, and determines whether an image capturing instruction is input (step S144). When the image capturing instruction is not input, the control section 101 performs the process of step S110.

When the image capturing instruction is input, the control section 101 (recording control section 101f) acquires imaging data from the imaging section 106, and stores the imaging data by recording the acquired imaging data in the memory 109 (step S146). After the storage of the imaging data, the control section 101 performs the process of step S110. Operations other than the above-mentioned operations are the same as the operations shown in FIG. 5, and thus the description thereof will not be given. The operations of the camera 200 according to the present embodiment are the same as the operations shown in FIG. 9, and thus the description thereof will not be given.

According to the present embodiment, before the camera operating terminal 100 and the camera 200 start the data communication, it is possible to start an operation for performing the settings for imaging (settings of imaging parameters).

In addition, even when the wireless connection between the camera operating terminal 100 and the camera 200 is not established, it is possible to store the captured image, and to prevent an image capturing timing from being missed.

(Fifth Embodiment)

Next, a fifth embodiment of the present invention will be described. The configuration of the camera operating terminal 100 according to the present embodiment is the same as the configuration shown in FIG. 10. In the present embodiment, the imaging parameters which are set in the imaging element of the imaging section 206 of the camera 200 when the camera 200 is started up are stored in the ROM 102 (storage section). When the camera operating terminal 100 has a memory, or when an external memory is mounted to the camera operating terminal 100, the above-mentioned imaging parameters may be stored in the memory. In the present embodiment, when the camera operating terminal 100 is started up, the imaging control section 101d sets the above-mentioned imaging parameters in the imaging element of the imaging section 106. The configuration of the camera 200 according to the present embodiment is the same as the configuration shown in FIG. 2, and thus the description thereof will not be given.

FIG. 19 is a diagram illustrating the imaging parameters which are stored in the ROM 202. As shown in FIG. 19, a table in which camera types and camera names are associated with imaging parameters (zoom amounts, focus positions, . . . , white balances) is stored in the ROM 102. The values of the imaging parameters which are stored in the table are initial values of the imaging parameters which are set in the imaging element of the imaging section 206 of the camera 200 when the camera 200 is powered on and the camera 200 is started up.

Figure 20:
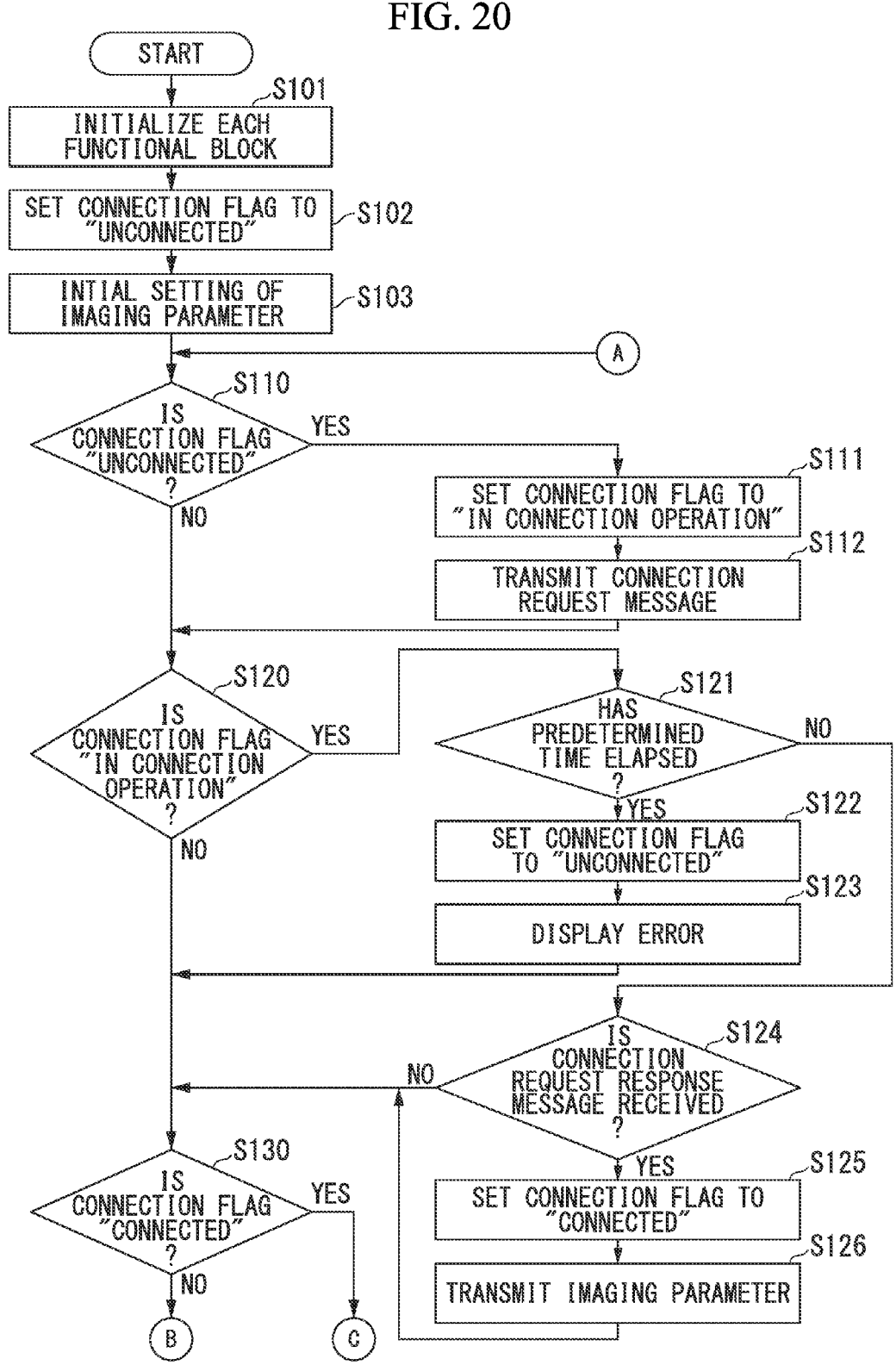
FIG. 20 is a flow diagram illustrating a procedure of operations of the camera operating terminal according to the fifth embodiment of the present invention.

The operations of the camera operating terminal 100 according to the present embodiment are realized by replacing the processes shown in FIG. 4 among the processes shown in FIGS. 4 to 8 with processes shown in FIG. 20. In FIG. 20, the same operations as the operations shown in FIG. 4 are denoted by the same step numbers.

In FIG. 20, after the connection flag is set in step S102, the control section 101 performs initial settings of the imaging parameters (step S103). In the present embodiment, the initial settings of the imaging parameters are not performed in step S101, but are performed in step S103. After the initial settings of the imaging parameters, the control section 101 performs the process of step S110. Operations other than the above-mentioned operations are the same as the operations shown in FIG. 4, and thus the description thereof will not be given.

Figure 21:
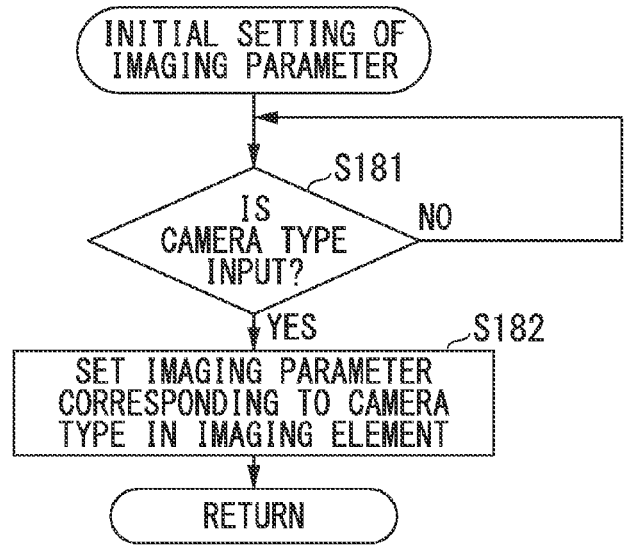
FIG. 21 is a flow diagram illustrating a procedure of operations of the camera operating terminal according to the fifth embodiment of the present invention.

FIG. 21 is a diagram illustrating the details of the initial settings of the imaging parameters (step S103). The control section 101 monitors a user's operation of the touch panel of the display section 108, and determines whether the camera type is input (step S181). When the camera type is not input, the control section 101 continues the monitoring of a user's operation and the determination of whether the camera type is input. When the camera type is input, the control section 101 (imaging control section 101d) reads out the imaging parameters corresponding to the input camera type in the ROM 102, and sets the imaging parameters in the imaging element of the imaging section 106 (step S182).

When the camera type corresponding to the camera 200 is not stored in the table shown in FIG. 19, it may be configured such that the camera type and the imaging parameters can be input by a user and be added to the table shown in FIG. 19.

The operations of the camera 200 according to the present embodiment are the same as the operations shown in FIG. 9, and thus the description thereof will not be given.

Figure 22A:
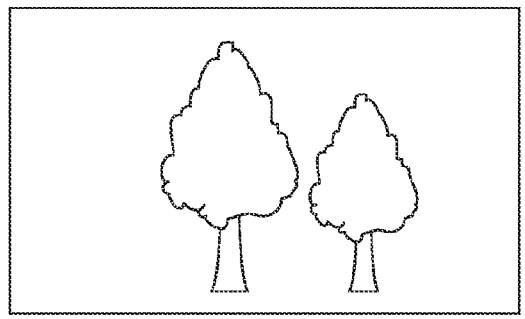
FIG. 22A is a reference diagram illustrating an image displayed on a display section of the camera operating terminal according to the fifth embodiment of the present invention.
Figure 22B:
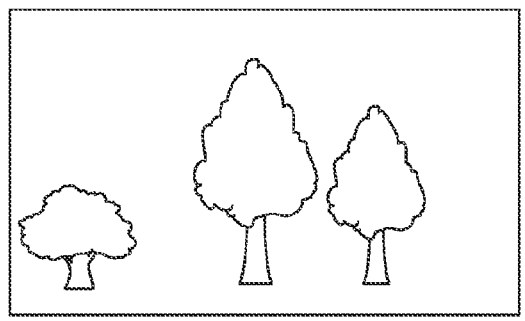
FIG. 22B is a reference diagram illustrating an image displayed on the display section of the camera operating terminal according to the fifth embodiment of the present invention.

FIGS. 22A and 22B are diagrams illustrating images when the initial settings (step S103) of the imaging parameters are not performed. FIG. 22A illustrates an image which is displayed on the display section 108 of the camera operating terminal 100 before the wireless connection between the camera operating terminal 100 and the camera 200 is established immediately after the camera operating terminal 100 and the camera 200 are started up, and FIG. 22B illustrates an image which is displayed on the display section 108 of the camera operating terminal 100 after the wireless connection between the camera operating terminal 100 and the camera 200 is established.

In FIG. 22A, an image based on imaging data generated in the imaging element of the imaging section 106 of the camera operating terminal 100 is displayed on the display section 108. In addition, in FIG. 22B, an image based on imaging data generated in the imaging element of the imaging section 206 of the camera 200 is displayed on the display section 108. Since the initial values of the imaging parameters of the camera operating terminal 100 and the camera 200 are different from each other, the visual field range of the image displayed on the display section 108 switches at a point in time when the image displayed on the display section 108 switches, and a state where a sense of discomfort is given to an operator is generated.

Figure 23A:
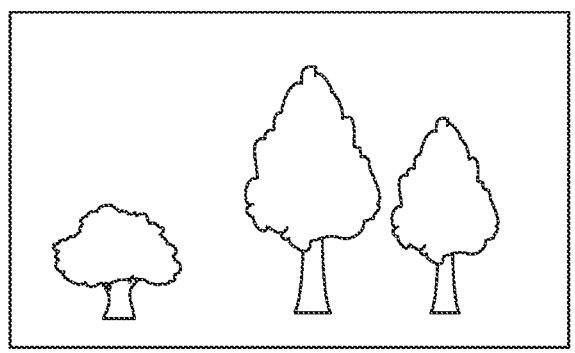
FIG. 23A is a reference diagram illustrating an image displayed on the display section of the camera operating terminal according to the fifth embodiment of the present invention.
Figure 23B:
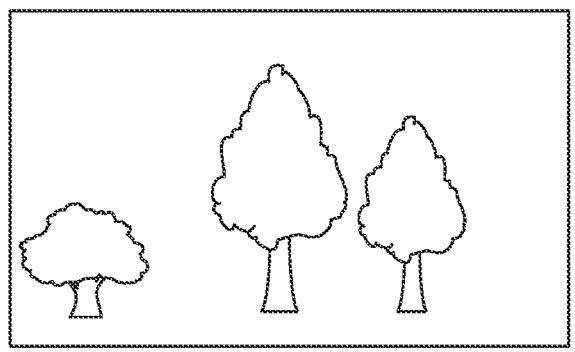
FIG. 23B is a reference diagram illustrating an image displayed on the display section of the camera operating terminal according to the fifth embodiment of the present invention.

FIGS. 23A and 23B are diagrams illustrating images when the initial settings (step S103) of the imaging parameters are performed. FIG. 23A illustrates an image which is displayed on the display section 108 of the camera operating terminal 100 before the wireless connection between the camera operating terminal 100 and the camera 200 are established immediately after the camera operating terminal 100 and the camera 200 are started up, and FIG. 23B illustrates an image which is displayed on the display section 108 of the camera operating terminal 100 after the wireless connection between the camera operating terminal 100 and the camera 200 is established.

In FIG. 23A, the image based on the imaging data generated in the imaging element of the imaging section 106 of the camera operating terminal 100 is displayed on the display section 108. In this case, the same imaging parameters as the imaging parameters which are set in the imaging element of the imaging section 206 at the time of the startup of the camera 200 are set in the imaging element of the imaging section 106 of the camera operating terminal 100. In FIG. 23B, the image based on the imaging data generated in the imaging element of the imaging section 206 of the camera 200 is displayed on the display section 108. FIG. 23B illustrates an image when a user does not give an instruction for the settings for imaging in step S143 of FIG. 5. Since the initial values of the imaging parameters of the camera operating terminal 100 and the camera 200 are the same as each other, it is possible to reduce a changes in the visual field range by the image displayed on the display section 108 switching. Therefore, it is possible to prevent a sense of discomfort from being given to an operator.

According to the present embodiment, before the data communication between the camera operating terminal 100 and the camera 200 is started, it is possible to start an operation for performing the settings for imaging (settings of imaging parameters).

In addition, the process of step S103 is performed, and thus it is possible to reduce a change in the visual field range of an image when the image displayed on the display section 108 switches after the wireless reception of the imaging data (display image data) wirelessly transmitted from the camera 200 is started.

While preferred embodiments of the present invention have been described, the present invention is not limited to the embodiments. Additions, omissions, substitutions, and other variations may be made to the present invention without departing from the spirit and scope of the present invention. The present invention is not limited by the above description, but by the appended claims.

What is claimed is:

1. A camera operating terminal comprising:
   an imaging element of which a visual field range is adjusted so as to overlap at least a portion of the visual field range of a camera, and which generates a first imaging data;
   a communication interface which wirelessly communicates with the camera;
   a display interface which displays an image;
   an operation interface which receives a user's operation;
   a display control section which causes the display interface to display an image corresponding to the first imaging data before the communication interface starts wireless reception of a second imaging data which is wirelessly transmitted from the camera, and causes the display interface to display an image corresponding to the second imaging data wirelessly received by the communication interface after the communication interface starts the wireless reception of the second imaging data;
   a parameter generating section which generates imaging parameters when an instruction for the imaging parameters is input by the operation interface being operated in a state where the image corresponding to the first imaging data is displayed on the display interface; and
   a communication control section which causes the communication interface to wirelessly transmit the imaging parameters generated by the parameter generating section to the camera, and causes the communication interface to wirelessly receive the imaging data which is wirelessly transmitted from the camera.

2. The camera operating terminal according to claim 1, wherein
the communication control section causes the communication interface to wirelessly transmit the imaging parameters generated by the parameter generating section to the camera before the communication interface starts the wireless reception of the second imaging data.

3. The camera operating terminal according to claim 1, further comprising
an imaging control section that sets the imaging parameters generated by the parameter generating section in the imaging element, and controls an operation of the imaging element.

4. The camera operating terminal according to claim 3, further comprising
a storage section that stores imaging parameters which are set in the camera when the camera is started up,
wherein the imaging control section sets the imaging parameter stored by the storage section in the imaging element when the camera operating terminal is started up.

5. The camera operating terminal according to claim 1, further comprising
a report control section that performs control of reporting a user that the camera is enabled to perform imaging when a connection of wireless communication with the camera is established.

6. The camera operating terminal according to claim 1, further comprising
a report control section that performs control of reporting to a user that imaging by the camera is not performed when an imaging instruction is input by the operation interface being operated before a connection of wireless communication with the camera is established.

7. The camera operating terminal according to claim 1, further comprising
a recording control section that records the imaging data generated by the imaging element in a memory when an imaging instruction is input by operation interface being operated before a connection of wireless communication with the camera is established.

8. The camera operating terminal of claim 1 wherein when the display control section causes the display interface to display the image corresponding to the second imaging data wirelessly received by the communication interface after the communication interface starts the wireless reception of the second imaging data, the image corresponding to the second imaging data replaces the display of the image corresponding to the first imaging data.

9. An imaging system comprising:
a camera operating terminal; and
a camera,
wherein the camera operating terminal includes
a first imaging element of which a visual field range is adjusted so as to overlap at least a portion of a visual field range of the camera, and which generates a first imaging data,
a first communication interface that wirelessly communicates with the camera,
a display interface that displays an image,
an operation interface that receives a user's operation,
a display control section that causes the display interface to display an image corresponding to the first imaging data before the first communication interface starts wireless reception of a second imaging data which is wirelessly transmitted from the camera, and causes the display interface to display an image corresponding to the second imaging data wirelessly received by the first communication interface after the first communication interface starts the wireless reception of the second imaging data,
a parameter generating section that generates imaging parameter when an instruction for the imaging parameters is input by the operation interface being operated in a state where the image corresponding to the first imaging data is displayed on the display interface, and
a first communication control section that causes the first communication interface to wirelessly transmit the imaging parameter generated by the parameter generating section to the camera, and causes the first communication interface to wirelessly receive the second imaging data, and
wherein the camera includes
a second imaging element that generates a third imaging data,
a second communication interface that wirelessly communicates with the camera operating terminal,
an imaging control section that sets imaging parameters received by the second communication interface in the second imaging element when the second communication interface wirelessly receives the imaging parameter from the camera operating terminal, and controls an operation of the second imaging element, and
a second communication control section that causes the second communication interface to wirelessly receive the imaging parameters which are wirelessly transmitted from the camera operating terminal, and causes the second communication interface to wirelessly transmit the third imaging data in which the imaging parameters received by the second communication interface are set, to the camera operating terminal.

10. An imaging method comprising:
a step of causing a display interface of a camera operating terminal to display an image corresponding to a first imaging data generated by a first imaging element of the camera operating terminal of which a visual field range is adjusted so as to overlap at least a portion of a visual field range of a camera, before a first communication interface of the camera operating terminal starts wireless reception of a second imaging data which is wirelessly transmitted from the camera;
a step of causing a parameter generating section of the camera operating terminal to generates imaging parameters when an instruction for the imaging parameters is input by an operation interface of the camera operating terminal being operated in a state where the image corresponding to the first imaging data is displayed on the display interface,
a step of causing the first communication interface to wirelessly transmit the imaging parameters generated by the parameter generating section to the camera,
a step of causing a second communication interface of the camera to wirelessly receive the imaging parameters wirelessly transmitted from the camera operating terminal,
a step of causing an imaging control section of the camera to set the imaging parameters received by the second communication interface in an second imaging element of the camera, and to control an operation of the second imaging element,
a step of causing the second communication interface to wirelessly transmit a fourth imaging data, generated by the second imaging element in which the imaging parameters received by the second communication interface are set, to the camera operating terminal, a step of causing the first communication interface to wirelessly receive the second imaging data, and a step of causing the display interface to display an image corresponding to a second imaging data wirelessly received by the first communication interface.

11. A non-transitory computer-readable device storing a program that causes a computer to perform steps of:

causing a display interface to display an image corresponding to a first imaging data generated by an imaging element of which a visual field range is adjusted so as to overlap at least a portion of a visual field range of a camera before a communication interface starts wireless reception of a second imaging data which is wirelessly transmitted from the camera;

generating imaging parameters when an instruction for the imaging parameters is input by an operation interface being operated in a state where the image corresponding to the first imaging data is displayed on the display interface;

causing the communication interface to wirelessly transmit the generated imaging parameters to the camera;

causing the communication interface to wirelessly receive the second imaging data; and causing the display interface to display an image corresponding to the second imaging data wirelessly received by the communication interface.

12. The non-transitory computer-readable device of claim 11, wherein the act of causing the display interface to display the image corresponding to the second imaging data wirelessly received by the communication interface replaces the display of the image corresponding to the first imaging data.

* * * * *